US012055885B2

(12) United States Patent
Kikuchi

(10) Patent No.: US 12,055,885 B2
(45) Date of Patent: Aug. 6, 2024

(54) ELECTROPHOTOGRAPHIC IMAGE FORMING APPARATUS

(71) Applicant: CANON KABUSHIKI KAISHA, Tokyo (JP)

(72) Inventor: Ken Kikuchi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/224,647

(22) Filed: Jul. 21, 2023

(65) Prior Publication Data

US 2023/0359141 A1 Nov. 9, 2023

Related U.S. Application Data

(62) Division of application No. 17/858,335, filed on Jul. 6, 2022, now Pat. No. 11,747,764, which is a division
(Continued)

(30) Foreign Application Priority Data

Sep. 29, 2008 (JP) ................................ 2008-250333
Aug. 4, 2009 (JP) ................................ 2009-181941

(51) Int. Cl.
*G03G 15/00* (2006.01)
*G03G 21/16* (2006.01)
(Continued)

(52) U.S. Cl.
CPC ......... *G03G 21/1647* (2013.01); *G03G 21/16* (2013.01); *G03G 21/1671* (2013.01);
(Continued)

(58) Field of Classification Search
CPC .... G03G 15/00; G03G 21/16; G03G 21/1647; G03G 21/1671; G03G 21/1676
(Continued)

(56) References Cited

U.S. PATENT DOCUMENTS 4,875,077 A 10/1989 Takamatsu
5,630,198 A * 5/1997 Makino .............. G03G 15/0881 222/DIG. 1
(Continued)

FOREIGN PATENT DOCUMENTS

JP 01-167765 7/1989
JP 04-246665 9/1992
(Continued)

OTHER PUBLICATIONS

Excerpt translation of Office Action in Japanese Patent Application No. 2009-285547, dated Jun. 8, 2010.
(Continued)

*Primary Examiner* — Hoan H Tran
(74) *Attorney, Agent, or Firm* — Venable LLP

(57) ABSTRACT

An image forming apparatus includes a first unit movable to a first inside position of a main assembly and a second unit movable to a second inside position of the main assembly. The first unit includes a mounting portion for detachably mounting the second unit, and a contacting and spacing member movable between a first position for permitting a developing member of the second unit to contact an image bearing member of the first unit and a second position for spacing the developing member from the image bearing member.

1 Claim, 20 Drawing Sheets

Related U.S. Application Data of application No. 17/109,374, filed on Dec. 2, 2020, now Pat. No. 11,409,226, which is a division of application No. 16/860,144, filed on Apr. 28, 2020, now Pat. No. 11,022,932, which is a division of application No. 16/126,365, filed on Sep. 10, 2018, now Pat. No. 10,671,012, which is a division of application No. 15/800,410, filed on Nov. 1, 2017, now Pat. No. 10,095,181, which is a division of application No. 15/171,056, filed on Jun. 2, 2016, now Pat. No. 9,841,721, which is a division of application No. 14/699,432, filed on Apr. 29, 2015, now Pat. No. 9,360,832, which is a division of application No. 14/564,169, filed on Dec. 9, 2014, now Pat. No. 9,354,596, which is a division of application No. 13/585,044, filed on Aug. 14, 2012, now Pat. No. 8,929,772, which is a division of application No. 12/568,088, filed on Sep. 28, 2009, now Pat. No. 8,452,208.

(51) Int. Cl.
*G03G 21/18* (2006.01)
*G03G 15/08* (2006.01)

(52) U.S. Cl.
CPC ..... *G03G 21/1676* (2013.01); *G03G 21/1853* (2013.01); *G03G 15/0865* (2013.01); *G03G 2221/1684* (2013.01)

(58) Field of Classification Search
USPC .................................. 399/107, 110, 111, 117
See application file for complete search history.

(56) References Cited

U.S. PATENT DOCUMENTS

| | | | |
|---|---|---|---|
| 5,794,103 | A | 8/1998 | Oh |
| 6,118,961 | A | 9/2000 | Nomura et al. |
| 6,289,189 | B1 | 9/2001 | Numagami et al. |
| 6,336,018 | B1 | 1/2002 | Kawai et al. |
| 6,453,136 | B1 | 9/2002 | Tasumaru |
| 6,708,011 | B2 | 3/2004 | Nomura et al. |
| 6,714,750 | B2 | 3/2004 | Terada et al. |
| 6,735,405 | B2 | 5/2004 | Yokoi et al. |
| 6,832,057 | B2 | 12/2004 | Oguma et al. |
| 6,952,544 | B2 | 10/2005 | Kikuchi et al. |
| 7,073,251 | B2 | 7/2006 | Kikuchi et al. |
| 7,079,787 | B2 | 7/2006 | Ogino et al. |
| 7,184,688 | B2 | 2/2007 | Ishii |
| 7,185,735 | B2 | 3/2007 | Sahyoun |
| 7,296,341 | B2 | 11/2007 | Kikuchi et al. |
| 7,398,038 | B2 | 7/2008 | Tsuda et al. |
| 7,440,724 | B2 | 10/2008 | Morita et al. |
| 7,463,847 | B2 | 12/2008 | Sato |
| 7,486,907 | B2 | 2/2009 | Noguchi |
| 7,509,071 | B2 | 3/2009 | Yoshimura |
| 7,684,728 | B2 | 3/2010 | Okabe et al. |
| 7,715,756 | B2 | 5/2010 | Hattori |
| 7,747,198 | B2 | 6/2010 | Nakagima et al. |
| 7,756,441 | B2 | 7/2010 | Kanno et al. |
| 7,835,665 | B2 | 11/2010 | Okabe et al. |
| 7,856,192 | B2 | 12/2010 | Koishi et al. |
| 7,869,740 | B2 | 1/2011 | Yoshimura et al. |
| 7,890,012 | B2 | 2/2011 | Koishi et al. |
| 8,213,830 | B2 | 7/2012 | Nakashima |
| 8,417,141 | B2 | 4/2013 | Okabe |
| 10,095,181 | B2 | 10/2018 | Kikuchi |
| 2003/0053819 | A1 | 3/2003 | Nomura et al. |
| 2007/0077086 | A1 | 4/2007 | Takakuwa et al. |
| 2007/0147881 | A1 | 6/2007 | Okabe et al. |
| 2007/0160386 | A1 | 7/2007 | Kawamura |
| 2009/0220273 | A1 | 9/2009 | Tomatsu |
| 2010/0054800 | A1 | 3/2010 | Okabe |
| 2010/0135691 | A1 | 6/2010 | Kikuchi |
| 2010/0158559 | A1 | 6/2010 | Kikuchi |
| 2012/0315063 | A1 | 12/2012 | Kikuchi |
| 2021/0240105 | A1* | 8/2021 | Fukuoka ............ G03G 15/0868 |

FOREIGN PATENT DOCUMENTS

| | | |
|---|---|---|
| JP | 06-075440 | 3/1994 |
| JP | 08-054786 | 2/1996 |
| JP | 2001-142378 | 5/2001 |
| JP | 2001-222207 | 8/2001 |
| JP | 2003-015378 | 1/2003 |
| JP | 2004-117988 | 4/2004 |
| JP | 2004-258440 | 9/2004 |
| JP | 2005-221939 | 8/2005 |
| JP | 2006-154867 | 6/2006 |
| JP | 2006-171397 | 6/2006 |
| JP | 2006-184553 | 7/2006 |
| JP | 2007-178656 | 7/2007 |
| JP | 2007-199648 | 8/2007 |
| JP | 2007-213024 | 8/2007 |
| JP | 2007-213025 | 8/2007 |
| JP | 2007-322554 | 12/2007 |
| JP | 2008-026486 | 2/2008 |
| JP | 2009-162903 | 7/2009 |
| JP | 2010-151952 | 7/2010 |
| JP | 2012-137798 | 7/2012 |

OTHER PUBLICATIONS

Excerpt translation of Office Action in Japanese Patent Application No. 2009-181941, dated Mar. 30, 2010.
Excerpt translation of Office Action in Japanese Patent Application No. 2009-285547, dated Mar. 9, 2010.
Excerpt translation of Office Action in Japanese Patent Application No. 2009-181941, dated Nov. 10, 2009.
Office Action in Japanese Patent Application No. 2011-286696, mailed Nov. 7, 2012 (with translation).
Office Action in Japanese Patent Application No. 2012-163698, mailed Jan. 7, 2013 (with translation).
Office Action in Japanese Patent Application No. 2014-210245, dated Jul. 14, 2015.

* cited by examiner (a)

(b)

(c)

(a)

(b)

(a)

(b)

(c)

(a)

(b)

(a)

(b)

(a)

(b)

(a)

(b)

(a)

(b)

(a)

(b)

(a)

(b)

(a)

(b)

(c)

ELECTROPHOTOGRAPHIC IMAGE FORMING APPARATUS

FIELD OF THE INVENTION AND RELATED ART

The present invention relates to an electrophotographic image forming apparatus.

The electrophotographic image forming apparatus forms an image on a recording material using an electrophotographic image forming process. And, the examples of the electrophotographic image forming apparatus include an electrophotographic copying machine, an electrophotographic printer (a laser beam printer, and LED printer, for example) and a facsimile device. The recording material is the material on which the image is formed by the electrophotographic image forming apparatus, and they are paper or an OHP sheet, for example. Using a drawer member which can be drawn in and out relative to a main assembly is known in the field of the electrophotographic image forming apparatus. With such a structure, while supporting a plurality of cartridge the drawer member is pushed into the main assembly. By this, the cartridge can be mounted to the inside of the main assembly all together. The drawer member is pulled out to an outside from the main assembly. By this, the cartridge can be taken out outwardly of the main assembly all together. With this structure, in the state that the drawer member is outside a main assembly, an exchanging operation of the cartridge can be carried out. For this reason, the operativity in the exchanging operation of a cartridge of a user is improved (U.S. Pat. No. 6,708,011).

However, the above described structure, when the drawer member is pulled out of the main assembly, a part of a peripheral surface of a developing roller is exposed through a developing cartridge. For this reason, at the time of an exchanging operation of the developing cartridge, there is a possibility that a user may unintentionally contact to the developing roller and an electrophotographic photosensitive drum. In addition, there is a possibility that the developing roller may be inadvertently contacted to another member.

SUMMARY OF THE INVENTION

The object of the present invention is to provide an electrophotographic image forming apparatus, wherein the operativity in an exchange of the developing cartridge is improved. Another object of the present invention is to provide an electrophotographic image forming apparatus, wherein the user is prevented from touching inadvertently to the developing roller. A further object of the present invention is to provide an electrophotographic image forming apparatus, wherein the user is prevented from contacting inadvertently to the electrophotographic photosensitive drum.

according to an aspect of the present invention, there is provided an electrophotographic image forming apparatus for forming an image on a recording material, said electrophotographic image forming apparatus comprising an electrophotographic photosensitive drum; a developing cartridge including a developing roller for developing an electrostatic latent image formed on said electrophotographic photosensitive drum, a developer accommodating portion for accommodating a developer to be used by said developing roller to develop the electrostatic latent image, and a developing roller shutter movable between a protecting position for covering a part of a peripheral surface of said developing roller and a retracted position, retracted from the protecting position, for exposure the part of the peripheral surface of said developing roller, wherein said developing cartridge is detachably mountable to a main assembly of the apparatus; a cartridge supporting member movable, while detachably mounting said developing cartridge, between an inside position which is inside of said main assembly of the apparatus to mount said developing cartridge to said main assembly of the apparatus and an outside position which is outside of said main assembly of the apparatus to remove said developing cartridge from said main assembly of the apparatus; a force receiving portion, provided on said developing cartridge, for receiving a force for moving said developing roller shutter from the protecting position to the retracted position; and a force applying portion provided in said main assembly of the apparatus, wherein when said cartridge supporting member is moved from the outside position to the inside position, said force receiving portion contacts to said force applying portion to move said cartridge supporting member from the outside position to the inside position, in interrelation with which said force receiving portion contacted to said force applying portion receives the force from said force applying portion, thus moving said developing roller shutter from the protecting position to the retracted position.

According to the present invention, the operativity at the time of the exchange of the developing cartridge is improved. In addition, according to the present invention, the user is prevented from contacting inadvertently to the developing roller and the electrophotographic photosensitive drum.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

The preferred embodiments of the present invention will be described in conjunction with the accompanying drawings The dimensions, the materials, the configurations, the relative positions, and so on of the constituent parts which will be described hereinafter may be properly changed by one skilled in the art depending on the structures and the various conditions of a device to which this invention is applied, and the scope of this invention is not limited to specific dimensions, materials, configurations, relative positions and so on of the embodiments which will be described below.

Embodiment 1

Referring to FIG. 1-FIG. 11, an electrophotographic image forming apparatus (image forming apparatus) according to Embodiment 1 of the present invention will be described.

<Arrangement of Image Forming Apparatus>

Figure 1:
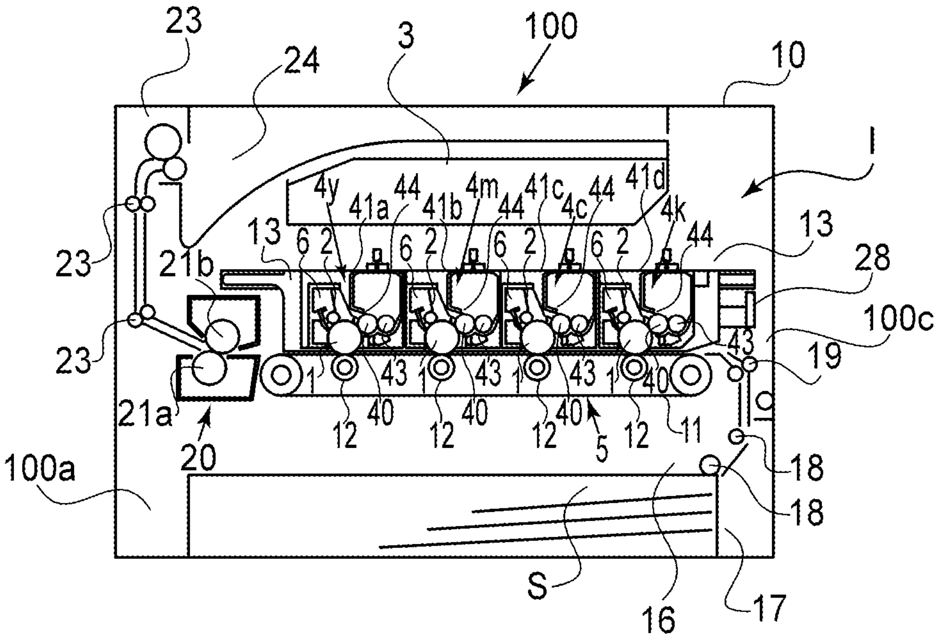
FIG. 1 is a sectional view of an image forming apparatus according to Embodiment 1.
Figure 1:
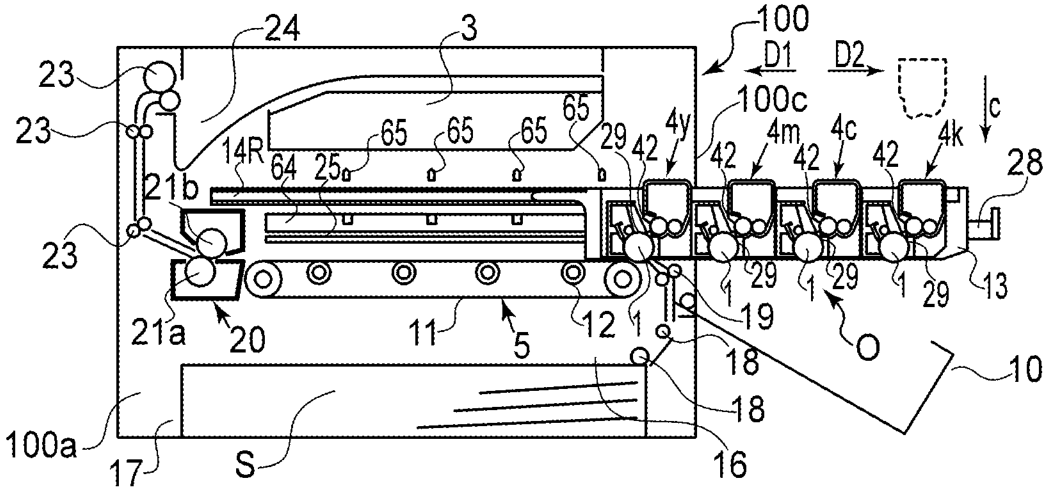
Figure 1:
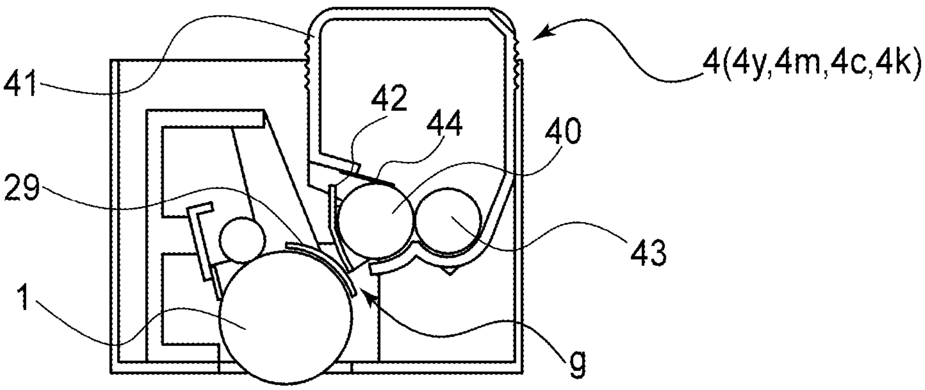

Referring to FIG. 1, the description will be made as to the structure of the image forming apparatus according to Embodiment 1 of the present invention. FIG. 1 is a sectional view (a) of the image forming apparatus. In FIG. 1, (b) is a sectional view illustrating the state that the drawer member is pulled out. In FIG. 1, (c) is an enlarged view of a part of a structure shown in (a) and (b) (adjacent the developing cartridge)).

The image forming apparatus 100 according to the present embodiment is provided with the four electrophotographic photosensitive drums 1 (photosensitive drum or arranged in a horizontal direction relative to an installation surface (unshown)). A drum 1 is rotated clockwisely by driving means (unshown) (FIG. 1(*a*)). In addition, the image forming apparatus 100 is provided with a charging members 2, a scanner units 3, a plurality of developing cartridges 4 (4*y*, 4*m*, 4*c*, 4*k*) and electrostatic transfer means 5 as electrophotographic image forming process means. A cartridge 4*y* includes a toner container (developer accommodating portion) 41*a* (FIG. 5) which contains the developer (toner) t of yellow color, and the image of a yellow color is formed. A cartridge 4*m* includes a toner container 41*b*, which contains the toner t of magenta color, and the image of a magenta color is formed. A cartridge 4*c* includes a toner container 41*c*, which contains the toner t of cyan color, and the image of a cyan color is formed. A cartridge 4*k* includes the toner container 41*d*, contains the toner t of black color, and the image of a black color is formed. These cartridges 4 are different in the color of the accommodated, but the structures are the same. Each cartridge 4 is mounted to a predetermined position of a drawer member 13. The charging member 2 charges a surface of the drum 1 uniformly. The scanner unit 3 projects a laser beam to a photosensitive drum 1 on the basis of image information to form an electrostatic latent image on the surface of the photosensitive drum 1. The cartridge 4 develops the electrostatic latent image formed on the surface of the photosensitive drum 1 with toner t (FIG. 5)). Transferring means 5 transfers the toner image formed on the photosensitive drum 1 onto a sheet material (recording material) S. The specific examples of a sheet material S include paper, an OHP sheet, and a cloth.

The image forming apparatus 100 is provided with a cleaning member (cleaning blade) 6 for removing the residual toner t which remains on the peripheral surface of the photosensitive drum after the transferring 1. The drum 1 includes an aluminum cylinder with an organic photoconductor layer (an OPC photosensitive member) applied on an outer surface thereof. The drum 1 is supported rotatably at the opposite ends thereof on the drawer member 13 by bearings (unshown). One of the ends is provided with a gear (unshown) for receiving a rotational force from a motor (unshown). By this, the rotational force from the motor is transmitted to the photosensitive drum 1 through a gear, and rotates it. The charging member 2 is a member of a contact charging type. More specifically, the charging member 2 is an electroconductive roller in the form of a roller, which is contacted to the surface of the photosensitive drum 1. To this roller a charging bias voltage is applied, by which, the surface of the photosensitive drum 1 is charged uniformly. Therefore, in the present embodiment, the charging member 2 is a charging roller. The scanner unit 3 is disposed in the upper portion of the photosensitive drum 1. In the unit 3, the image light (laser beam) corresponding to an image signal is emitted from a laser diode (unshown) and is projected to the charged the surface of the photosensitive drum 1. By this, an electrostatic latent image corresponding to the image signal is formed on the surface of the photosensitive drum 1. Each developing cartridge 4 is provided with a toner container 41 (41*a*, 41*b*, 41*c*, 41*d*) which accommodates the toner t. The toner t in the toner container 41 is supplied to toner supplying roller 43. Toner t is applied to the outer periphery of the developing roller 40 by the toner supplying roller 43 and a developing blade 44 press-contacted to an outer periphery of a developing roller 40, and it triboelectrically charged.

A developing bias is applied from a main assembly (main assembly) 100*a* to the developing roller 40. By this, the toner t is deposited to the latent image formed on the drum 1 to form a toner image. In this manner, the developing roller 40 develops the electrostatic latent image formed on the drum 1 using the toner t. The developing roller 40 opposes to the drum 1. When the toner t is consumed to the end of the lifetime, the developing cartridge 4 is exchanged individually (so-called cartridge type).

As shown in FIG. 1, the image forming apparatus 100 is provided with a transfer belt 11 circulated while opposing or contacting to all the photosensitive drums 1. And, a sheet material S is fed to a transfer position by the belt 11, and the toner image formed on the surface of the drum 1 is transferred onto sheet material S. In an inside of each belt 11, a transfer roller 12 is provided at a position opposing to the drum 1. The charge of the positive polarity is applied from these transfer rollers 12 to the sheet material S through the belt 11. By this, the toner image is transferred from the photosensitive drum 1 onto sheet material S.

A device 100 is provided with a feeding portion 16 for feeding sheet material S to an image forming station. The feeding portion 16 is provided with a cassette 17 which accommodates a plurality of sheet material S. At the time of an image formation, a feeding roller 18 rotates in accordance with the image forming operation. By this, the sheet materials Ss in the cassette 17 are fed one by one. The sheet material S is fed to the belt 11 by a registration roller couple 19 in synchronism with the rotation and the toner image of the belt 11. The device 100 is provided with a fixing portion 20 for fixing a toner image transferred onto sheet material S. The fixing portion 20 has a rotatable heating roller 21*b* and a pressing roller 21*a* press-contacted thereto. The sheet material S onto which the toner image on the drum 1 has been transferred is fed while being nipped and fed by the rollers 21*b*, 21*a*, during which the heat and the pressure are applied to it. By this, the toner image is fixed on the surface of the sheet material S.

The image formation process is summarized as follows. When the image forming operation is started, the drum 1 is rotated. And, a charging member (charging roller) 2 applies the uniform charge to the surface of the drum 1. The unit 3 exposes the surface of the charged drum 1 to the image signal, to form the electrostatic latent image on the surface of the drum 1. The developing roller 40 develops the electrostatic latent image. On the other hand, the sheet material S is fed by the feeding portion 16, it fed by the belt 11, and the toner images formed on the surfaces of the drum 1 are sequentially transferred onto the sheet material. The transferring of the toner image is carried out by an electric field formed between the drum 1 and the transfer roller 12. The sheet material S onto which the four-color toner image has been transferred is fed to the fixing portion 20, where the color image is fixed. The sheet material S which passes the fixing portion 20 is discharged from a discharging portion 24 to an outside of the device by a discharging roller pair 23.

<Drawer Member>

Figure 17:
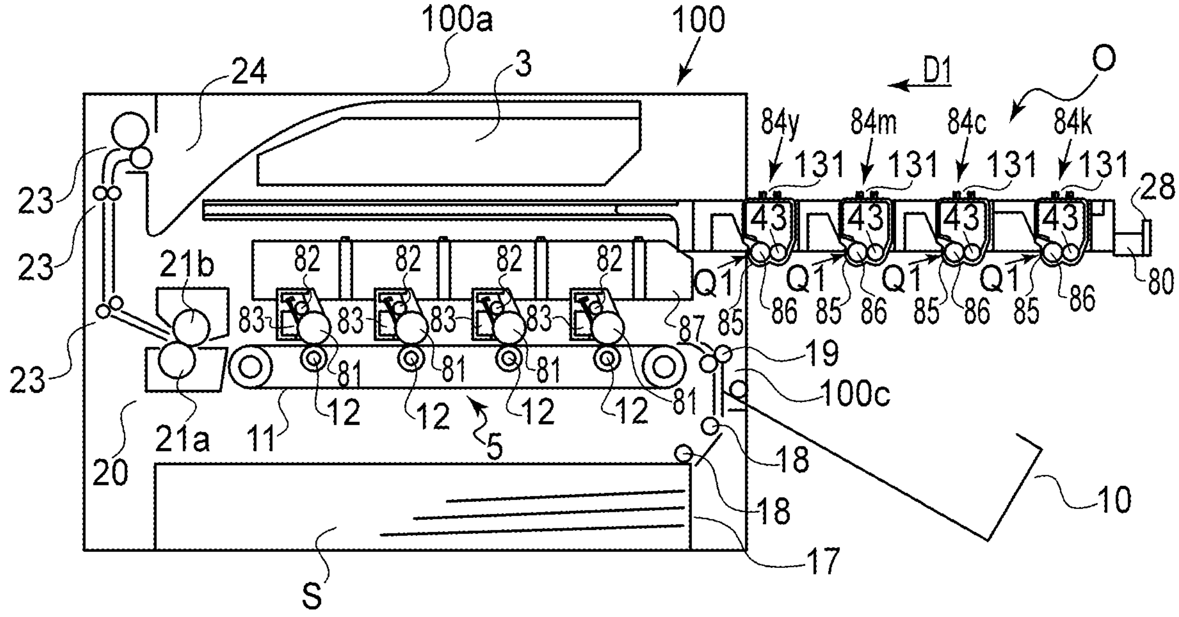
FIG. 17 is a sectional view of the image forming apparatus according to Embodiment 3.
Figure 17:
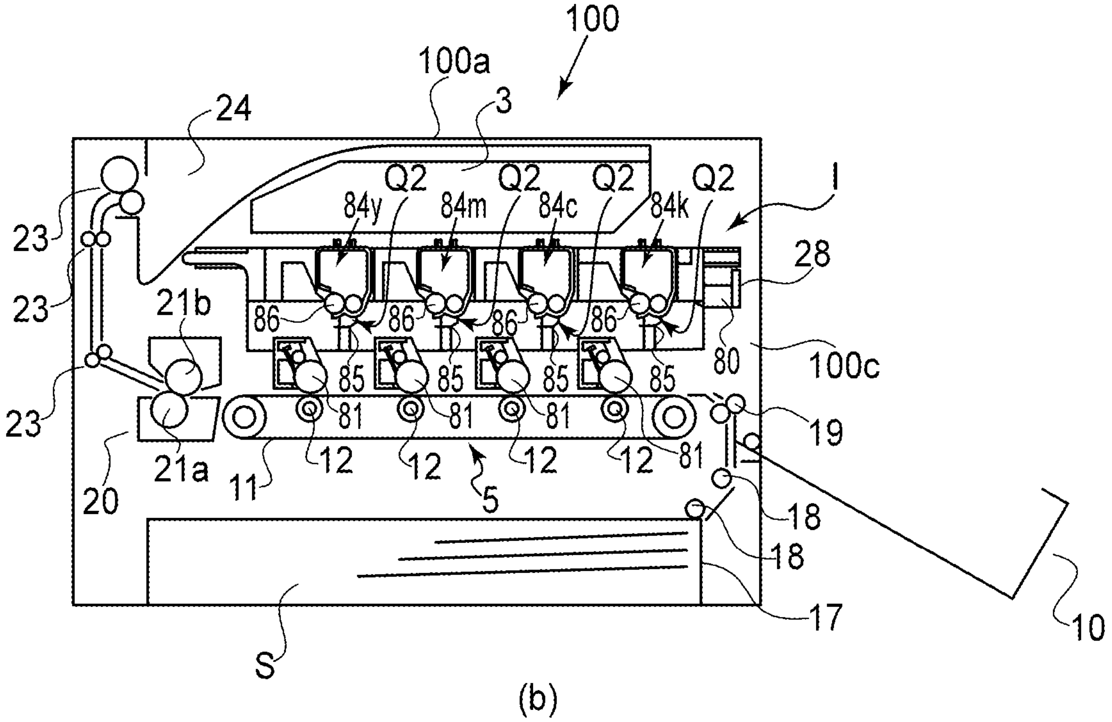
Figure 18:
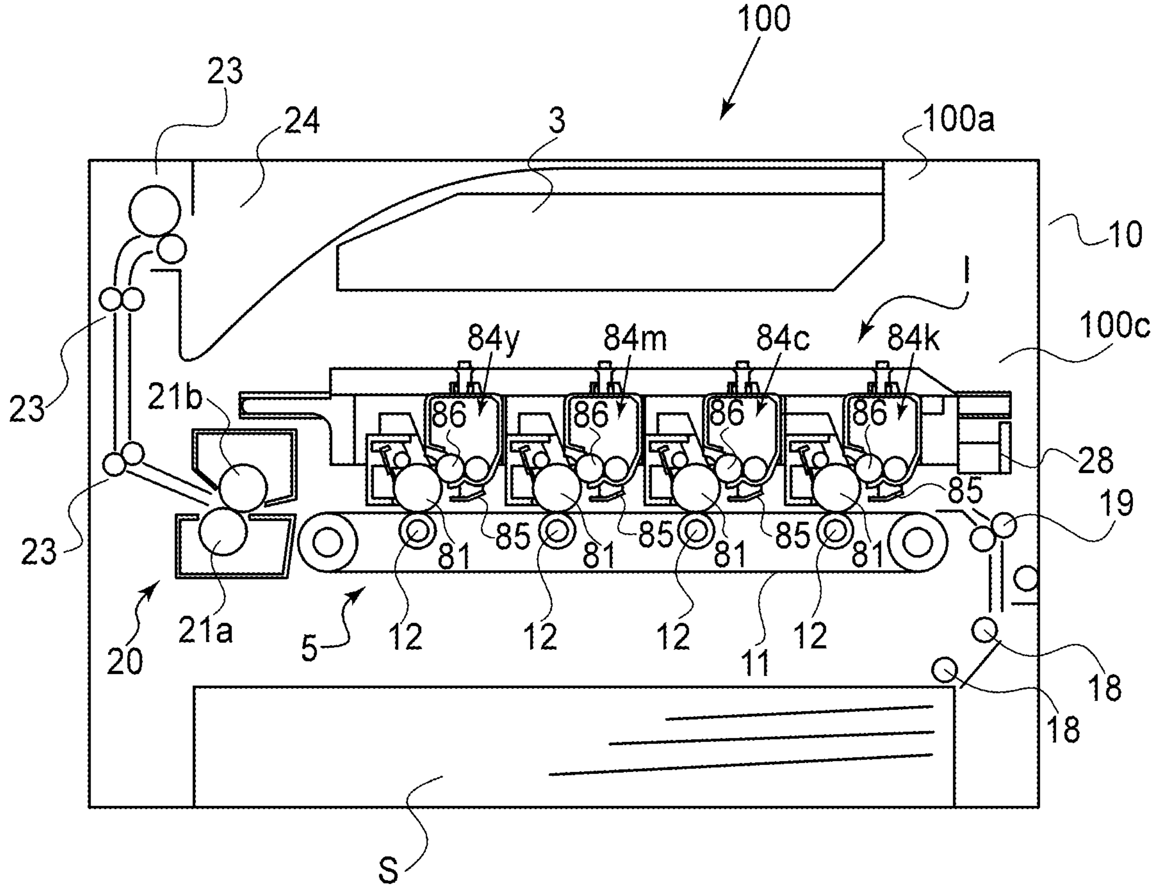
FIG. 18 is a sectional view of the image forming apparatus according to Embodiment 3.

The drawer member (cartridge supporting member) 13 will be described. The cartridges 4 are dismountably mounted on the drawer member 13. The drawer member 13 is movable between an accommodating position (inside position I) that the cartridge 4 is placed in the inside of the main assembly 100*a* and a drawn position (outside position (0)) in which the cartridge 4 is outside the main assembly. More particularly the drawer member 13 is movable between the inside position I and outside position O. The drawer member 13 is moved by the user. Here, (a) of FIG. 1, (b) of FIG. 17, and FIG. 18 show the drawer member 13 in the state of being the inside position I. And, (b) of FIG. 1, (b) of FIG. 8, (b) of FIG. 14, and (a) of FIG. 17 show the drawer member 13 in the state of being the outside position O. And in addition, (a) of FIG. 1, (b) of FIG. 17, and FIG. 18 illustrate the state in which the drawer member 13 is in the inside position I, and the drum 1 contacts to the belt 11. This position is an image forming position. Here, in this embodiment, the main assembly 100*a* is the portions of the apparatus 100 other than the drawer member 13 and the members (parts) fixed or detachably mounted to this drawer member 13.

As shown in (b) of FIG. 1, the drawer member 13 is moved linearly in the horizontal direction (arrows D1, d2) which is parallel with the installation surface (unshown) of the main assembly 100*a*. The user pushes the drawer member 13 from outside position O in the direction of the arrow D1 into the inside position I. The user pulls the drawer member 13 out of the inside position I in the direction of the arrow D2 into outside position O. In the state that the drawer member 13 is placed in outside position O, the user carries out the exchange (mounting and demounting) of the cartridge 4 on the drawer member 13. In the state that the drawer member 13 is placed in the outside position O (drawn position) the user moves the cartridge 4 in the direction of gravity (direction of arrow C in (b) of FIG. 1) substantially to mount it to the drawer member 13. The cartridge 4 mounted in this manner is disposed so that the longitudinal direction (an axial direction of the developing roller 40) thereof is substantially perpendicular to a movement direction of the drawer member 13. The four developing cartridges 4 are arranged in the movement direction of the drawer member 13. In taking out the cartridge 4 from the drawer member 13 from the drawer member 13, the user raises the cartridge 4 in the direction of arrow C is the opposite direction.

The cartridge 4 is moved into the main assembly 100*a* with the drawer member 13 in the state of being on the drawer member 13. And, in the state that the drawer member 13 is placed in the inside position I, the user closes a door 10. By this, the drawer member 13 lowers and all the cartridges 4 are set the predetermined positions (image forming position) in the main assembly 100*a*. The drum 1 contacts with the belt 11 in the image forming position.

In this manner, according to the device 100 of the present embodiment, the four cartridges 4 can be mounted into the main assembly all together. And, the four cartridges 4 can pull out to the outside of the main assembly all together. Therefore, the operativity in the exchange of the cartridge is excellent as compared with the structure that a cartridge is mounted into the main assembly individually. In this embodiment, the drum 1, charging member (charging roller) 2 and the cleaning member 6 are mounted to the drawer member 13. However, the photosensitive drum 1, the charging member 2, and the cleaning member 6 may be unified into an integral process cartridge. In the case of the process cartridge, the process cartridge may be detachably mountable to the drawer member 13. And, the process cartridge is dismountably mounted to the main assembly 100*a* by the movement of the drawer member 13.

<Portion of Drawer Member>

Figure 2:
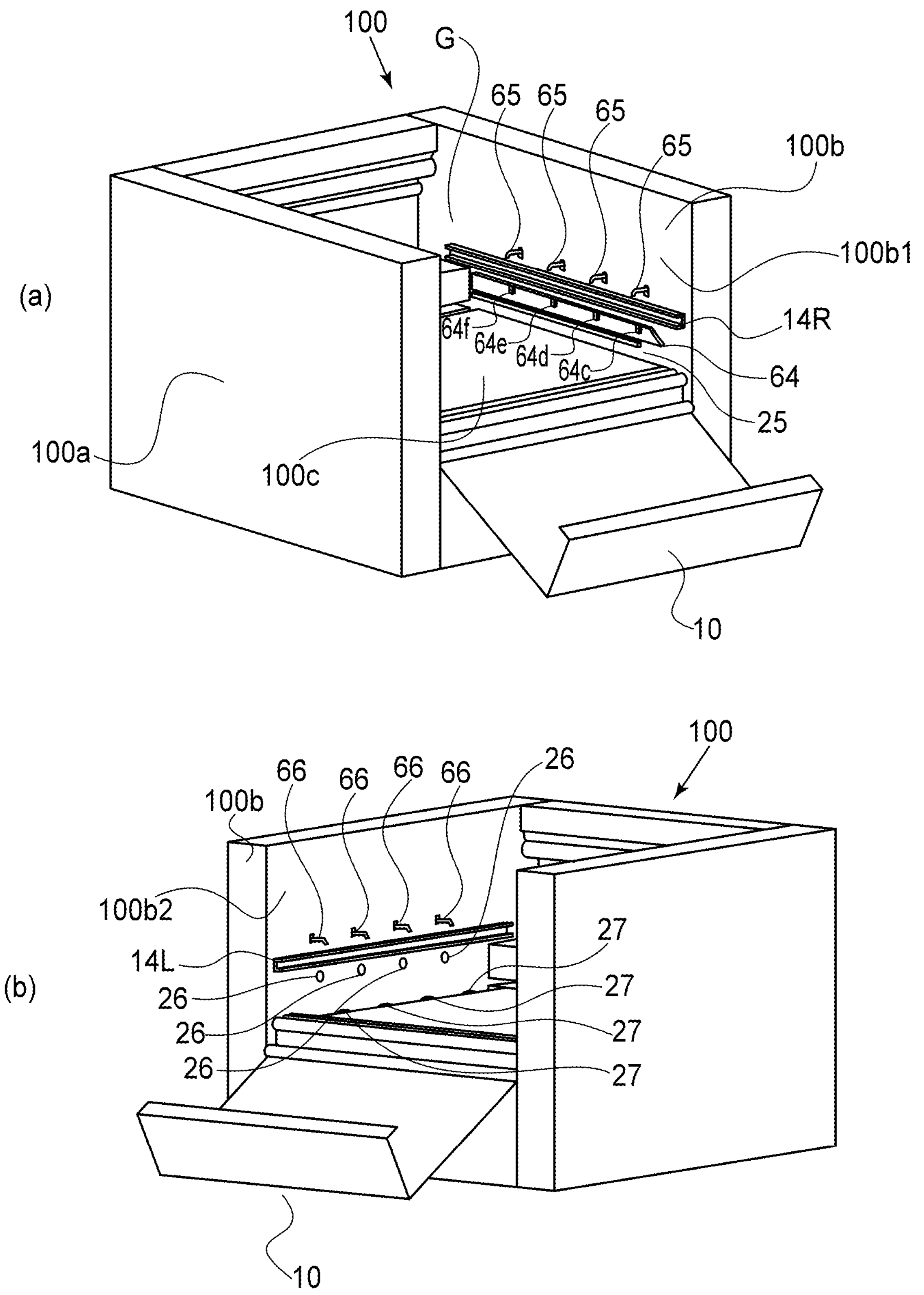
FIG. 2 is a perspective view illustrating a mounting portion of a drawer member according to Embodiment 1.

Referring to (a) and (b) of FIG. 2, the structure of a mounting portion G for the drawer member 13 provided in the main assembly 100*a* will be described. Here, (a) and (b) of FIG. 2 are perspective views illustrating mounting portion G of the drawer member according to Embodiment 1. In the Figure, for the better illustration of the structure of mounting portion G, the scanner unit 3 and so on are omitted among the parts which constitute the main assembly 100*a*. In addition, (a) and (b) of FIG. 2 are perspective views as seen in the different directions.

Inner wall surfaces 100*b*1, 100*b*2 of a main assembly frame 100*b* are provided with a pair of guiding members 14 (14R, 14L) which opposes to each other. The movement direction of the drawer member 13 is regulated by the guiding member 14. The drawer member 13 moves along the guiding member 14. The guiding member 14 is a rail-like member which has a channel-like section and guides the portions-to-be-guided 13*a*, 13*b*, 13*c*, and 13*d* (FIG. 4(*a*)(*b*) of the drawer member 13. The guiding member 14 is extended the substantially horizontal direction from the neighborhood of the door 10 of the main assembly 100*a* to a rear side. By this, the guiding member 14 can guide the drawer member 13 from the outside position O to the inside position I. In addition, above the guiding member 14, the urging members for pressing and positioning the cartridge 4 to the predetermined position 65, 66 are provided. These urging members 65, 66 are moved downwardly in interrelation with the closing operation of door (opening and closing member) 10. By this, the urging members 65, 66 press the cartridge 4 to a main assembly side positioning portion (unshown) provided in the main assembly 100*a*. The cartridge 3 is positioned at the image forming position in the main assembly by the urging members 65, 66. The door (opening and closing member) 10 openably closes an opening 100*c*. The opening 100*c* is passed by the drawer member 13 when the drawer member 13 moves between the inside position I and outside position O.

As shown in (a) of FIG. 2, shutter guides are provided below a guiding member 14R 25, 64. A guide 25 is the member for opening and closing a drum shutter 29 which covers the upper portion of the drum 1 (FIG. 3) in the state that the drawer member 13 is placed in outside position O. In addition, a guide 64 moves a developing roller shutter 42 for covering the developing roller 40 exposed through a frame 4*s* of the cartridge 4 (FIGS. 5 and 6) in the state that the drawer member 13 is placed in outside position O. The guides 25, 64 are extended the substantially horizontal direction toward the rear side from the neighborhood of the entrance of the main assembly. As shown in (b) of FIG. 2, below the guiding member 14L, the coupling members (main assembly side coupling members 26) are arranged in the position corresponding to the cartridges 4 substantially at the regular intervals in the horizontal direction. The coupling member 26 transmits the rotational force for rotating the developing roller 40 from the main assembly 100*a* to the cartridge 4. The rotational force is transmitted to the toner supplying roller 43 to rotate the roller 43. In the state where the door 10 is opened, the coupling member 26 is retracted into the main assembly frame 100*b* (b) of FIG. 2)). The coupling member 26 enters the cartridge (4) side in interrelation with the closing operation of the door 10. And, the coupling member 26 is engaged with a cartridge side coupling member 45. Furthermore, below the coupling member 26, a drum driving gear for transmitting a rotational force for rotating the drum 1 from the main assembly to the drum 1 (main assembly side gear) 100*a* 27 is provided. The gears 27 are horizontally arranged with substantially the regular intervals. The gear 27 and the coupling member 26 are provided on the same main assembly frame (100*b*) and are rotated by the rotational force from a driving source (unshown) provided in the main assembly 100*a*.

<Drawer Member>

Figure 3:
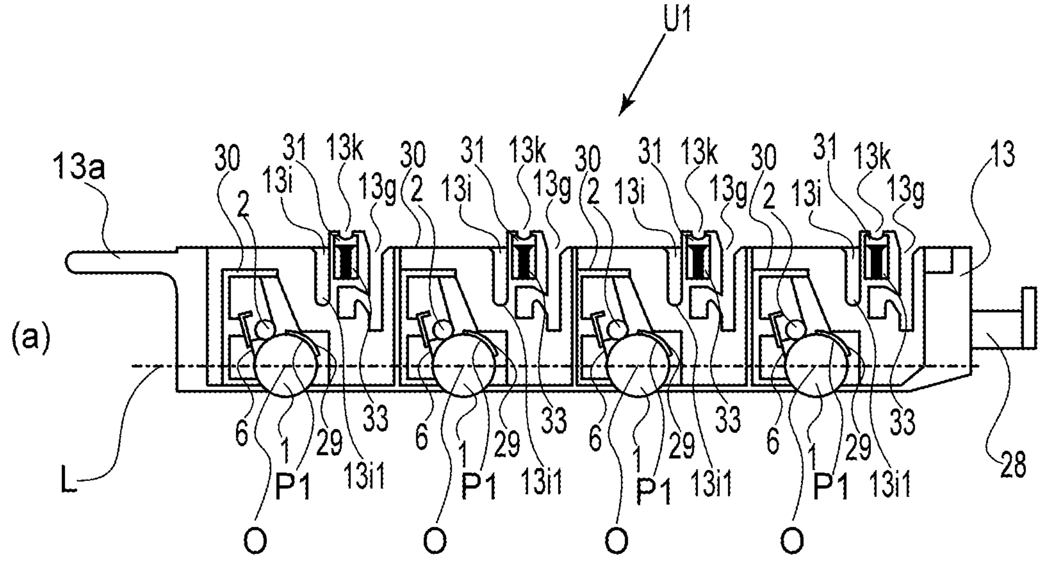
FIG. 3 is an illustration of a drawer unit according to Embodiment 1.
Figure 3:
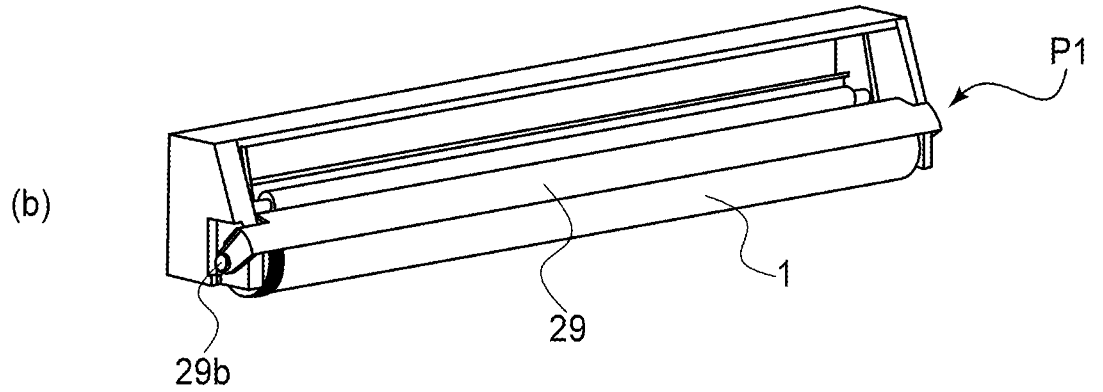
Figure 3:
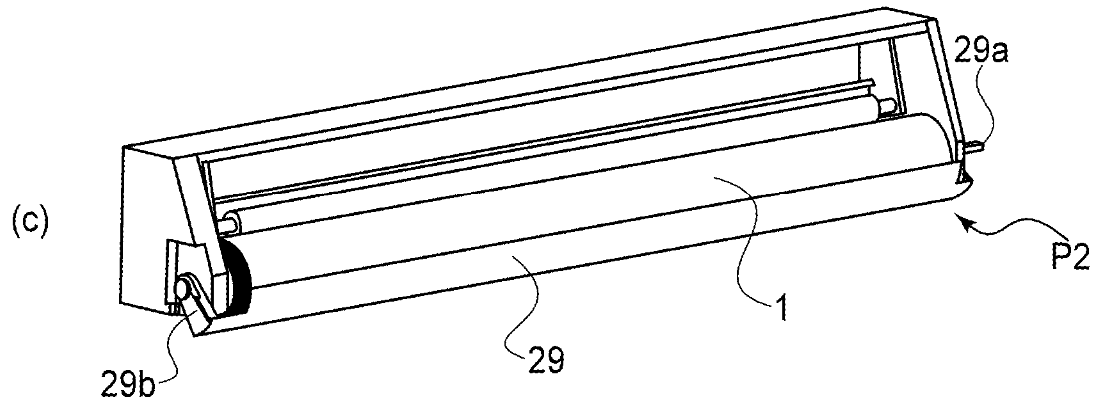
Figure 4:
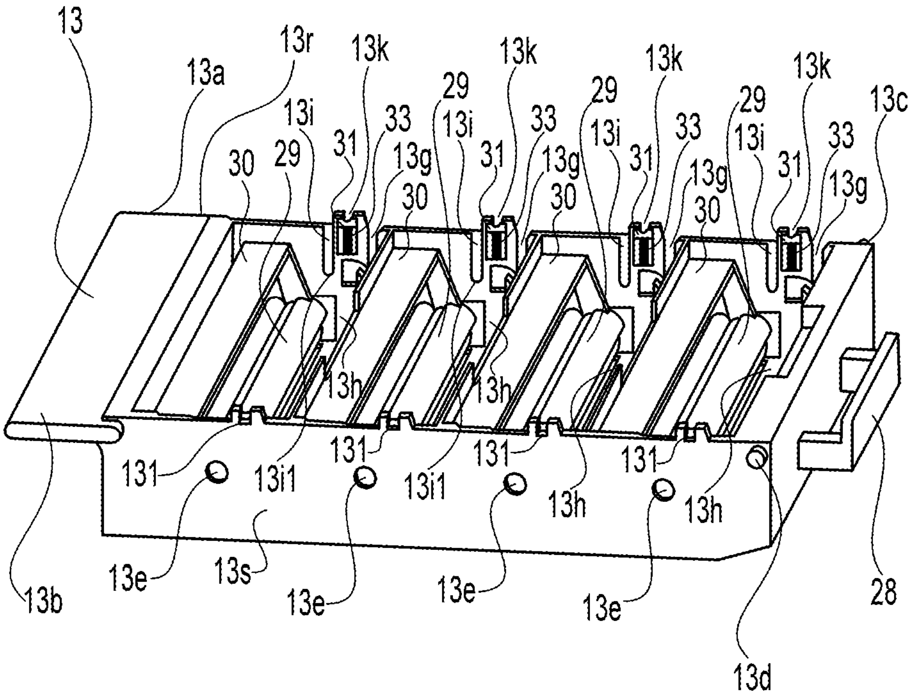
FIG. 4 is a perspective view of the drawer unit according to Embodiment 1.
Figure 4:
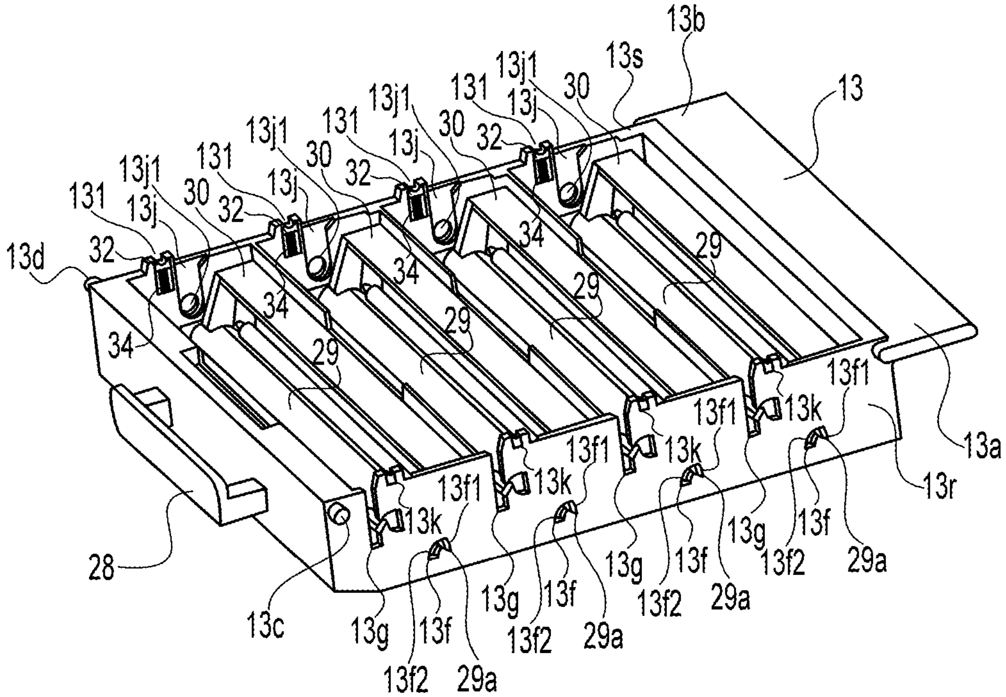

Referring to FIG. 3-FIG. 4, the drawer member 13 will be described. Here, (a) of FIG. 3 is a sectional view of the drawer unit U1 according to Embodiment 1. And, (b) and (c) of FIG. 3 are the perspective views of the portions which are provided with the photosensitive drums 1. And in addition, (a) and (b) of FIG. 4 are the perspective views of the drawer units U1. In addition, (a) and (b) of FIG. 4 are the perspective views, as seen from the different direction.

In this embodiment, the drum 1, the charging member 2, and the cleaning member 6 are securedly fixed to the drawer member 13, and the drawer unit U1 is constituted by these means. More specifically, the unit U1 includes the drawer member 13, the photosensitive drum 1, the charging member 2, a cleaning container 30, the cleaning members 6, the shutters 29, the supporting portions 31, 32, and urging members 33, 34. The drum 1 and the charging member 2 are provided rotatably to the unit U1. Here, "fixing" means the structure which does not assume the user dismounts it from the unit U1. Four corners of the drawer member 13 are provided with the portions-to-be-guided 13 (13*a*, 13*b*, 13*c*, 13*d*) guided by the guiding members 14R, 14L of the main assembly 100*a*. The portions-to-be-guided 13*a*, 13*c* are guided by the guiding member 14R, and the portions-to-be-guided 13*b*, 13*d* are guided by the guiding member 14L. The portions-to-be-guided, 13*a*, 13*b* outwardly project from a side wall 13 (13*r*, 13*s*) in the direction crossing with the drawing direction D2 in the upstream side with respect to the drawing direction D2. The portions-to-be-guided 13*a*, 13*b* project toward the upstream side in the drawing direction D2. By this, the portions-to-be-guided 13*a*, 13*b* are suppressed in the downward inclination in the state that the drawer member 13 is placed in the outside position O. In addition, the portions-to-be-guided 13*c*, 13*d* outwardly project from the side wall 13 (13*r*, 13*s*) in the direction crossing with the drawing direction D2 in the downstream side of the drawing direction D2. The portions-to-be-guided 13*c*, 13*d* each have a cylindrical shape. The downstream end, with respect to a drawing direction D2, of the drawer member 13 is provided with a grip part 28 for operating the drawer unit U1. As shown in (a) of FIG. 4, furthermore, one of the side walls 13*s* of the drawer member 13 is provided with an opening 13*e* which the coupling member 26 enters. The coupling member 26 enters the opening 13*e* in interrelation with the closing operation of the door 10. The coupling member 26 which entered through the opening 13*e* engages with the cartridge side coupling member 45 ((a) of FIG. 6) of the cartridge 4. By this, the rotational force is transmitted to the developing cartridge 4 through the coupling member 26 and a coupling member 45 from the driving source (unshown) provided in the main assembly 100*a*.

<Drum Shutter>

More particularly, referring to (b) of FIG. 3-FIG. 4, the drum shutter 29 will be described. The shutter 29 for protecting the surface of the drum 1 above the drum 1 is provided. The shutter 29 is supported pivotably by the cleaning container 30 fixed to the drawer member 13 and is rotatable within the predetermined range. The container 30 supports the photosensitive drum 1, too. In the state that the drawer member 13 is in the outside position O, the shutter 29 is in a protecting position P1 of covering the portion which is a contact surface at which the photosensitive drum 1 contacts to the developing roller 40 (FIG. 3). The protecting position P1 is above a horizontal plane L through center (axis) 0 of the drum 1 The shutter 29 covers at least the above-described portion of the photosensitive drum 1 over the length.

One longitudinal end portion of the shutter 29 is provided with a force receiving portion 29*a* for receiving the force from the shutter guide 25. The force receiving portion 29*a* outwardly projects through an opening 13*f* provided in the drawer member 13 (FIG. 4)). When the drawer member 13 moves toward the inside position I from outside position O, the guide 25 as a force applying portion abuts to the force receiving portion 29*a*, to push the force receiving portion 29*a*. More particularly, the force receiving portion 29*a* moves from an end 13*f*1 of an arcuate opening 13*f* against an elastic force of a torsion coil spring (elastic material) 29*b* to the other end 13*f*2. By this, the shutter 29 rotates. In this manner, the shutter 29 is moved from the protecting position P1 shown in (a) and (b) of FIG. 3 to an exposing position P2 that the portion which is the contact surface contacted to the developing roller 40 among the peripheral surfaces of the drum 1 is exposed (c) of FIGS. 3, and 11)). The shutter 29 is normally urged toward a protecting position P1 by the elastic force of the torsion coil spring (elastic material) 29*b*. By this, when the drawer member 13 is in the outside position O, the shutter 29 is normally in the protecting position P1 (*a*) (b) of FIG. 3)). The one end of the spring 29*b* is mounted to the shutter 29, and the other end thereof is mounted to the drawer member 13. The elastic material may not be limited to the torsion coil spring but it may be a tension spring, a compression coil spring, a leaf spring, and so on, for example. In the present embodiment, the spring 29*b* and the force receiving portion 29*a* is provided at each of the longitudinal ends of the drum 1. Here, the longitudinal direction of the drum 1 is perpendicular to the movement direction (the direction of arrows D1, d2) of the drawer member 13. By this, each mechanism can be disposed efficiently.

In this manner, in the state that the drawer member 13 is pulled to the outside of the main assembly 100*a*, the surface of the drum 1 is protected by the shutter 29. Therefore, at the time, for example, of mounting and dismounting operation of the cartridge 4, the upper surface of the drum 1 is not abutted by foreign matter. In addition, it can be avoided that the user touches the surface of the photosensitive drum 1 inadvertently. In the present embodiment, the shutter member 42 which covers the surface of the developing roller 40 is used, but, in order to provide the functional effects described above, it not necessary to employ the shutter member 42.

In the drawer member 13, the mounting portion 13*h* for mounting the cartridge 4 is provided at the position opposing to each drum 1 ((a) of FIG. 4). And, the sides of the mounting portion 13*h* are provided with the guide portions 13*i*, 13*j*, 13*k*, 131 for guiding the cartridge 4 in the drawer member 13. Each guide portion 13*i*, 13*j*, 13*k*, 131 comprises an elongated groove. The lower portion of the guide portion (13*i*, 13*j*) is provided with a positioning portion (13*i*1, 13*j*1) for positioning the cartridge 4. The neighborhood of the lower end of a guide portion 13*j* is provided with an opening 13*e*. The insides of guide portions 13*k*, 131 are provided with the supporting portions 31, 32 for holding the cartridge 4 in the positions spaced from the drum 1 in the state that the drawer member 13 is pulled out. The inside of the guide portion 13*k*, 131 is provided with a compression coil spring (elastic material) 33, 34 for urging the supporting portion 31, 32. In addition, a side of the guide portion 13*k* is provided with an opening 13*g* for accepting a force receiving portion 42*a* provided on a shutter 42 ((b) of FIG. 4). The description will be made with respect to the shutter 42.

<Shutter for Developing Cartridge and Developing Roller>

Figure 5:
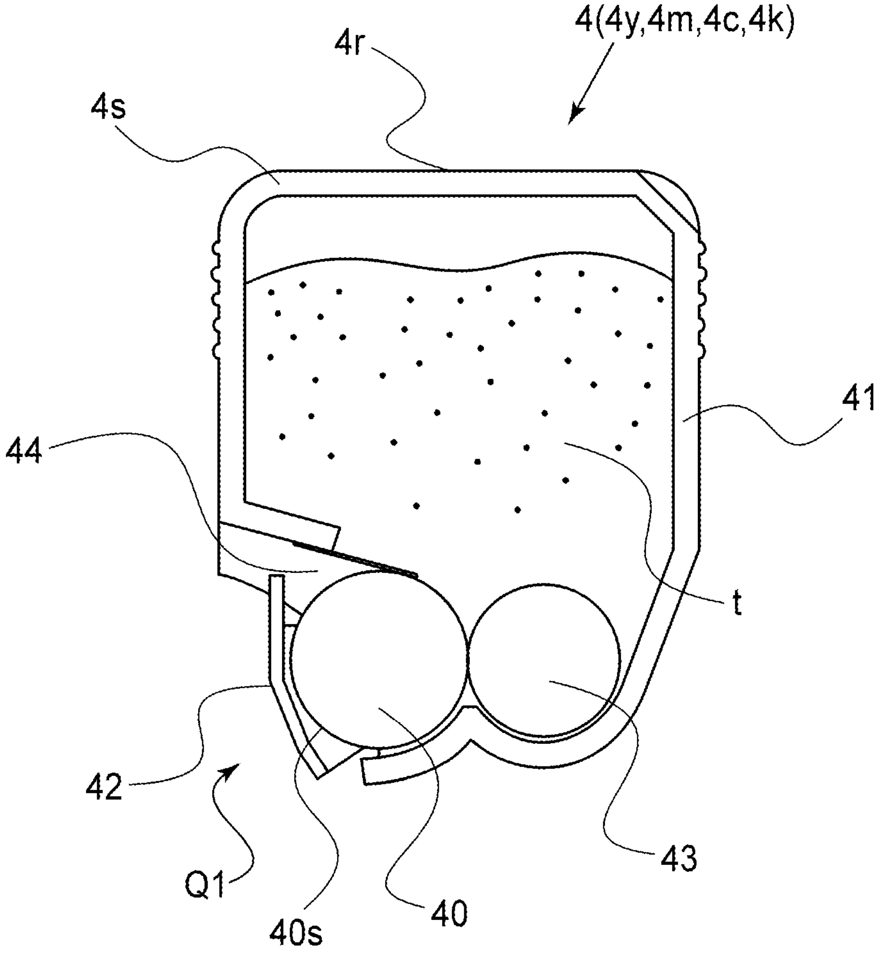
FIG. 5 is a sectional view of a developing cartridge according to Embodiment 1.
Figure 6:
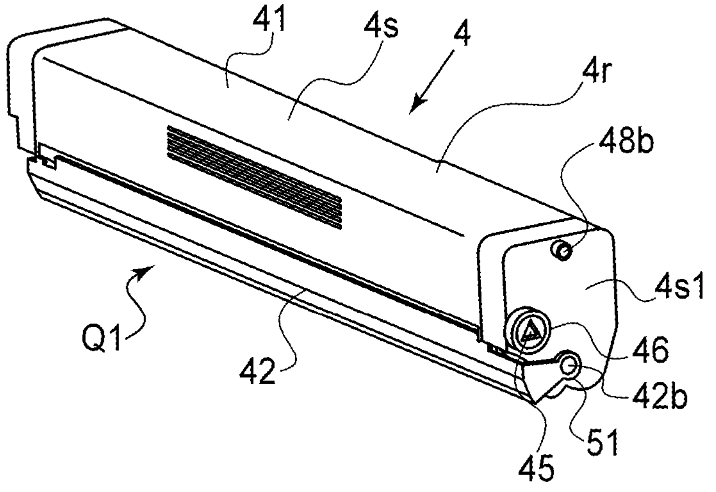
FIG. 6 is a perspective view of the developing cartridge according to Embodiment 1.
Figure 6:
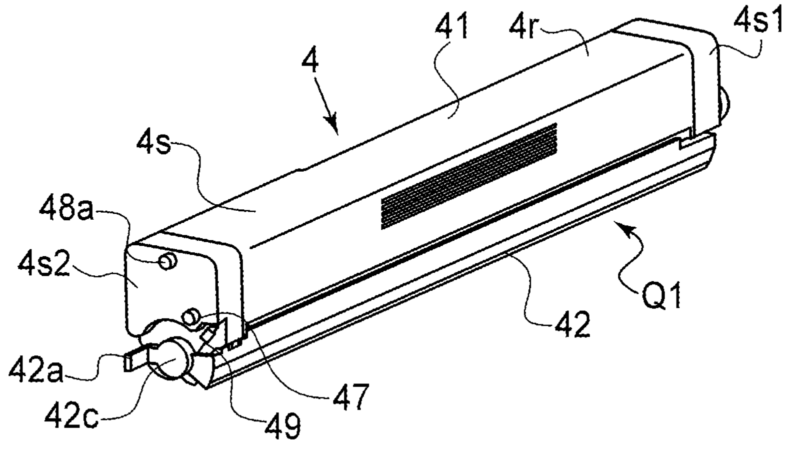
Figure 6:
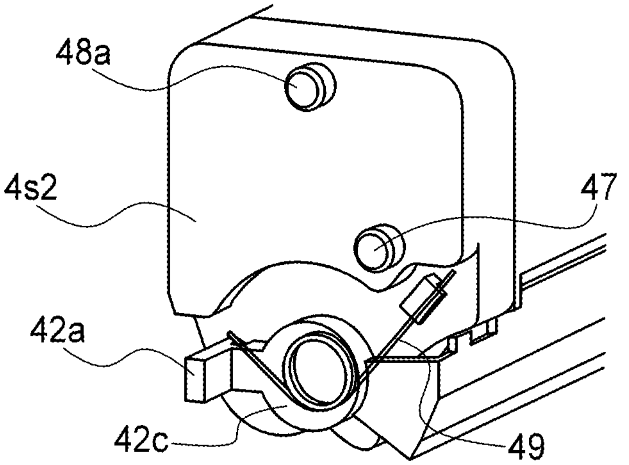

Referring to (a), (b) and (c) of FIG. 5-FIG. 6, the cartridge 4 dismountable from the drawer member 13 will be described. FIG. 5 is a sectional view of the cartridge 4. And, (a) and (b) of FIG. 6 are perspective views of the cartridge 4. More particularly, (a) and (b) of FIG. 6 are perspective views, as seen from different directions. Here, (c) of FIG. 6 a partly enlarged view of (b) of FIG. 6.

The cartridge 4 is provided with the developing roller 40, the toner supplying roller 43, the developing blade 44, the toner accommodating chamber 41, and the shutter 42. A blade 44 is press-contacted to the peripheral surface of the developing roller 40, to regulate the amount of the toner t deposited on the peripheral surface of the roller 40. The cartridge 4 is dismountably mounted to the drawer member 13 by the user, therefore, it dismountably mounted to the main assembly 100*a*. The toner t in the container 41 is fed into the roller 43. The toner t is deposited to the peripheral surface of the developing roller 40 by the roller 43 and the blade 44, and the charge is applied to the toner t thereby. The developing bias voltage is applied from the main assembly 100*a* to the developing roller 40. By this, the toner t is deposited to the latent image formed on the drum 1 to form the toner image. In other words the latent image is developed by the developing roller 40. Here, when the toner t in the container 41 is consumed up, the user exchanges the cartridge 4. By this, the image formation can be carried out again.

As shown in (a) of FIG. 6, one longitudinal end portion of the cartridge 4 supports the coupling member 45 for receiving the rotational force from the coupling member 26 rotatably. The coupling member 45 is engaged with the coupling member 26 to receive the rotational force. The rotational force is transmitted to the developing roller 40 and the roller 43 through the gear (unshown). By this, the rollers 40, 43 are rotated in a predetermined direction. The outer periphery of the coupling member 45 is covered with a cylindrical rib. The rib is a portion-to-be-guided 46 to be guided by the guide portion 13*j* provided on the drawer member 13. The portion-to-be-guided 46 is provided on a side cover 4*s*1 provided at the end of a container 41. The portion-to-be-guided 46 also has a function as a portion to be positioned for positioning the cartridge 4 in a positioning portion 13*j*1 ((b) of FIG. 4) provided in the drawer member 13.

As shown in (b) of FIG. 6, the opposite side, with respect to a longitudinal direction, of the cartridge 4 is provided with a portion-to-be-guided 47 to be guided by the guide portion 13*i* provided on the drawer member 13. The portion-to-be-guided 47 is provided on a side cover 4*s*2 provided at the other end of the container 41. The longitudinal direction of the cartridge 4 is the longitudinal direction (axial direction) of the developing roller 40. The portion-to-be-guided 46, 47 projects longitudinally outwardly from a widthwise end (side cover 1 or of 4*s*) of the frame 4*s* of the cartridge 4. The portion-to-be-guided 46, 47 has the guiding function when the cartridge 4 is mounted to the drawer member 13, and a positioning function for the developing cartridge 4 in the inside of the drawer member 13 when it taken out.

As shown in (a) and (b) of FIG. 6, the upper portions of both widthwise ends of the cartridge 4 are provided with the projections 48*a*, 48*b*. Here, the upper portion is the position above the widthwise end (side cover 4*s*) in the state where the cartridge 4 is mounted to the drawer member 13 (main assembly 100*a*). The projection (portion-to-be-guided) 48*a* is guided by the guide portion 13*k* when the cartridge 4 is mounted and demounted relative to the drawer member 13. The projection (portion-to-be-guided) 48*b* is guided by a guide portion 131 at the time of mounting and demounting the cartridge 4 relative to the drawer member 13. In order to support the cartridge 4 (developing roller 40) in the position spaced from the photosensitive drum 1 the projection 48*a*, 48*b* also has the function as a supported portion supported by the supporting portions 31 and 32 ((a) and (b) of FIG. 4). In other words in order to establish the state that the developing roller 40 and the photosensitive drum 1 spaces from each other, the projection 48*a* is supported by the supporting portion 31. Similarly, a projection 48*b* is supported by a supporting portion 32. When the cartridge 4 is positioned at the predetermined position of the main assembly 100*a* the projection 48*a*, 48*b* also has the function as a portion-to-be-urged pressed by the main assembly. The projection 48*a* is pressed by the urging member 65 ((a) of FIG. 2). The projection 48*b* is pressed by an urging member 66 ((b) of FIG. 2).

The shutter 42 which covers the portion that the developing roller 40 is exposed through the frame 4*s* of the cartridge 4 will be described in detail. The cartridge 4 is provided with the shutter 42 rotated within the predetermined range about a rotation axis (42*b*, 42*c*) relative to the container 41. The shutter 42 is placed at a protecting position Q1 (FIGS. 5 and 6) in the free-state of the cartridge 4. The shutter 42 covers the portion 40*s* that the developing roller 40 is exposed through frame 4*s* (container 41). In the state where the shutter 42 is placed in the protecting position Q1 (the position shown in FIG. 5), it extends in the longitudinal direction ((a) and (b) of FIG. 6) so that it covers substantially all the range, with respect to the longitudinal direction, of the developing roller 40. The portion 40*s* where the developing roller 40 is exposed through the frame 4*s* is a region where the developing roller 40 faces to the photosensitive drum 1 at the time of the development. In addition, the free-state of the cartridge 4 is the state that the cartridge 4 is not mounted to the drawer member 13. In addition, the shutter 42 is movable between the protecting position Q1 for covering an exposed portion 40*s* of the developing roller 40 and a retracted position Q2 (*b*) of FIG. 10) where the portion 40*s* is exposed. The one longitudinal end portion of the shutter 42 is provided with a torsion coil spring (elastic material) 49. The one end of a spring 49 is mounted to the shutter 42, and the other end thereof is mounted to the widthwise end (side cover 4*s*2). By this, the shutter 42 is urged to the protecting position Q1 by the elastic force of the spring 49. Therefore, the shutter 42 is normally placed in the protecting position Q1. The spring 49 may not be limited to the torsion coil spring but may be the tension spring, the compression coil spring, a leaf spring, or a rubber or the like proper elastic material. The one-end portion of the shutter 42 is provided with the force receiving portion 42*a* for receiving the force from the developing roller shutter guide 64 ((a) of FIG. 2) and it projects longitudinally outwardly. The guide 64 is extended along the movement direction of the drawer member 13, and is provided on an inner wall surface 100*b*1 in parallel with the side of the drawer member 13 ((a) of FIG. 2). When the drawer member 13 moves toward the inside of the main assembly 100*a*, the force receiving portion 42*a* abuts to the guide 64, and is pushed thereby. By this, the shutter 42 is rotated. And, the shutter 42 is moved from the protecting position Q1 (FIG. 5) to the retracted position Q2 ((b) of FIG. 10).

In this manner, the surface of the developing roller 40 is substantially covered by the shutter 42 in the normal state. For this reason, when the user manipulates the cartridge 4, the user cannot touch the surface of the developing roller 40 inadvertently. Therefore, the scattering of the toner t from the surface of the developing roller 40 and the damage of the surface of the developing roller 40 are prevented. In addition, in mounting the cartridge 4 to the drawer member 13 the collision to the drawer member 13 of the developing roller 40 is prevented, and the surface thereof is not damaged.

<Mounting of Developing Cartridge to Drawer Member>

Figure 7:
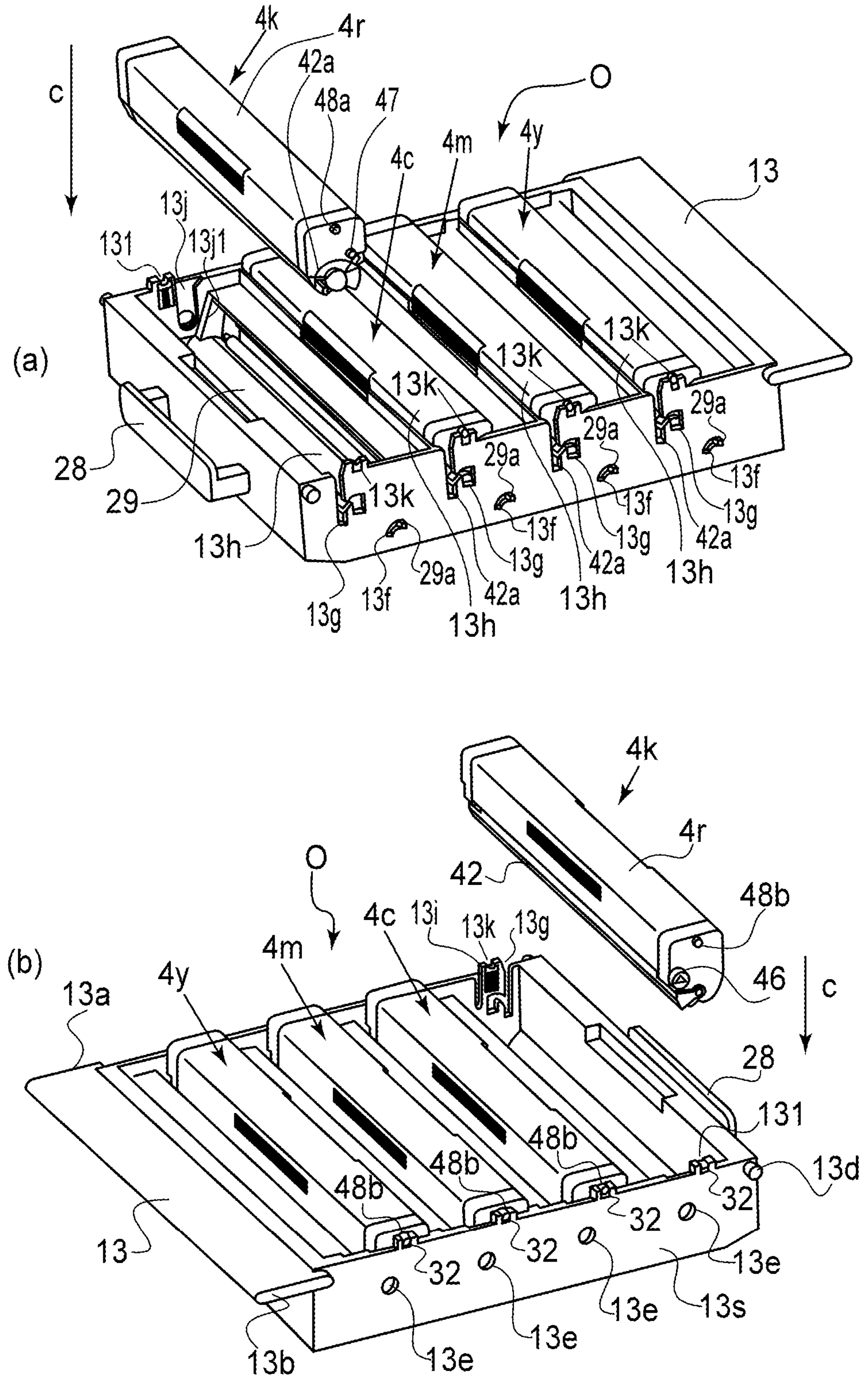
FIG. 7 is a perspective view illustrating the state at the time of mounting the developing cartridge according to Embodiment 1.
Figure 8:
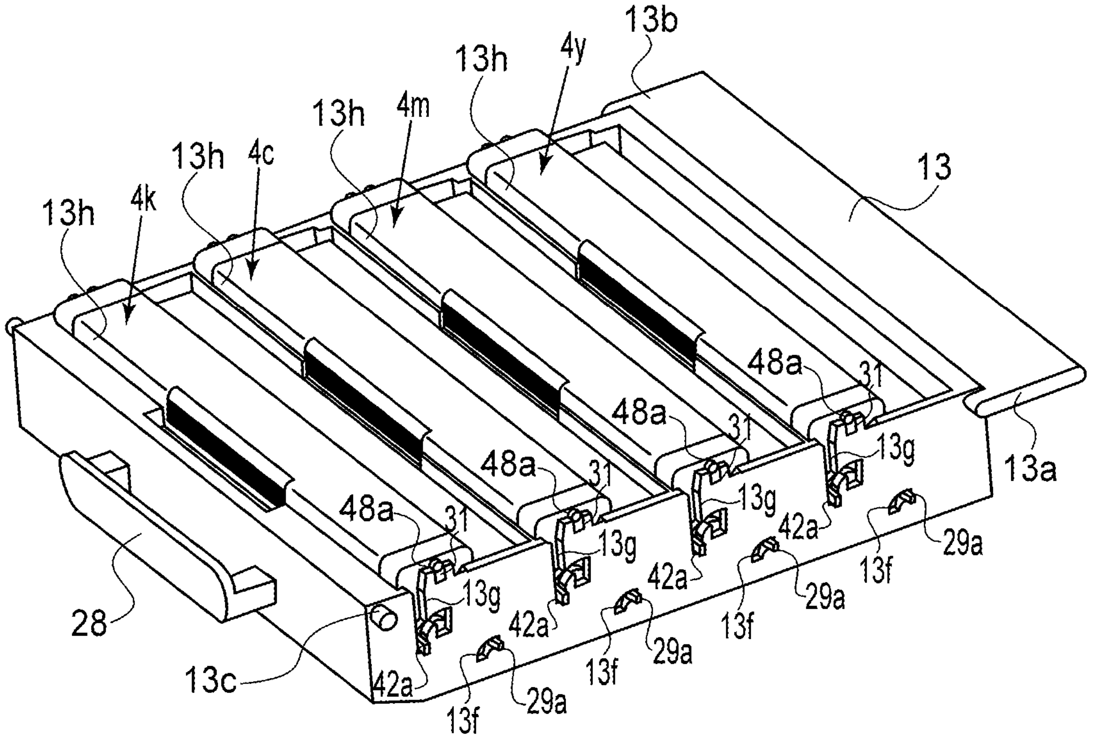
FIG. 8 is a perspective view of the drawer member according to Embodiment 1.
Figure 8:
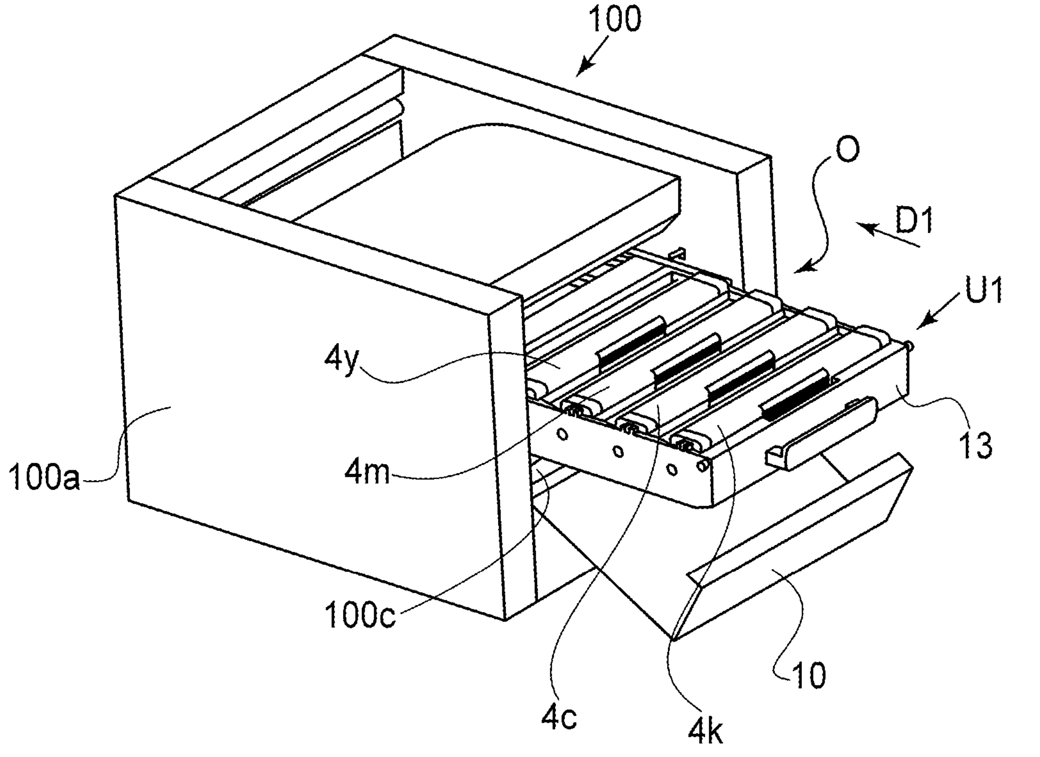

Particularly referring to (a) of FIG. 7-FIG. 8, the description will be made as to the mounting of the cartridge 4 relative to the drawer member 13. Here, (a) and (b) of FIG. 7 are perspective views illustrating the state that the cartridge 4 is mounted to the drawer member 13. The mounting of the cartridge 4 is carried out in the state that the drawer member 13 is outside the main assembly 100*a*. However, in (a) and (b) of FIG. 7, the main assembly 100*a* is omitted for better illustration. In addition, (a) and (b) of FIG. 7 are perspective views, as seen from different directions. An, (a) of FIG. 8 is a perspective view illustrating the state that all the cartridges 4 are mounted to the drawer member 13. Also in (a) of FIG. 8, the main assembly is omitted for better illustration.

The cartridge 4 is mounted to the corresponding mounting portion 13*h* provided to the drawer member 13. The user mounts the developing cartridge 4 in the direction of gravity (arrow C) substantially (FIG. 7). At the time of the mounting, first, the portion-to-be-guided 46, 47 provided at the opposite ends of the cartridge 4 is engaged with the correspondence guide portion 13*j*, 13*i* of the drawer member 13. In other words the portion-to-be-guided 46 is aligned with the guide portion 13*j*, the portion-to-be-guided 47 is aligned with the guide portion 13*i*, the projection (the portion-to-be-guided) 48*a* is aligned with the guide portion 13*k*, and, the projection (the portion-to-be-guided) 48*b* is aligned with the guide portion 131. The cartridge 4 is dropped to the drawer member 13. In this case, the force receiving portion 42*a* provided at the one-end portion of the shutter 42 is inserted into the opening 13*g*. In this manner, the cartridge 4 is guided to the guide portions 13*j*, 13*i*, 13*k*, 131, and is mounted to the inside of the drawer member 13 ((a) of FIG. 8). Here, (b) of FIG. 1 is a sectional view at that time. By this, the projections 48*a*, 48*b* are placed on a supporting portion (spacer member) 31, 32. The projection 48*a* is supported by the supporting portion 31, and the projection 48*b* is supported by the supporting portion 32 (*b*) of FIG. 7, ((a) of FIG. 8). Therefore, the projection 48*a* is pushed upwardly by the elastic force of a spring 33, and the projection 48*b* is pushed upwardly by the elastic force of the spring 34. Therefore, in the state that the drawer member 13 is placed in outside position O, the one longitudinal end portion of the cartridge 4 is pushed up by the elastic force of the spring 33, and the other end thereof is pushed up by the elastic force of the spring 34 ((b) and (c) of FIG. 1). In the cartridge 4 in this state, the developing roller 40 spaces from the photosensitive drum 1 (FIG. 2). And, the shutters 29, 42 are placed between the drum 1 and the developing roller 40. The shutter 29 is placed in the protecting position P1 for covering the upper portion of the drum 1, and the shutter 42 is placed in the protecting position Q1 for covering the exposed portion 40*s* of the developing roller 40. At this time, the portions-to-be-guided 46, 47 provided on the cartridge 4 is not contacted to the main assembly side positioning portions 13*i*1, 13*j*1 for positioning the cartridge 4 to the main assembly 100*a*.

In this manner, the cartridge 4 (developing roller 40) is spaced from the photosensitive drum 1, when it set the drawer member 13 by the dropping, and the spacing state is maintained. Therefore, the surface of the photosensitive drum 1 is not damaged by the operation of mounting the cartridge 4 to the drawer member 13. As shown in FIG. 8, the force receiving portion 42*a* of the shutter 42 projects outwardly of the drawer member 13 from the opening 13*g*. The force receiving portion 29*a* of the shutter 29 also outwardly projects from the opening 13*f* provided in the drawer member 13. The force receiving portion 29*a*, 42*a* projects in the direction (widthwise direction of the drawer member 13, the longitudinal direction of the cartridge 4) perpendicular to the movement direction of the drawer member 13.

As has been described in the foregoing, in the state where the cartridge 4 is only mounted to the drawer member 13, the developing roller 40 is in the position spaced from the photosensitive drum 1. At this time, the force receiving portions 29*a*, 42*a* project outwardly of the drawer member 13.

<Mounting of Drawer Member to the Inside of Main Assembly>

Figure 9:
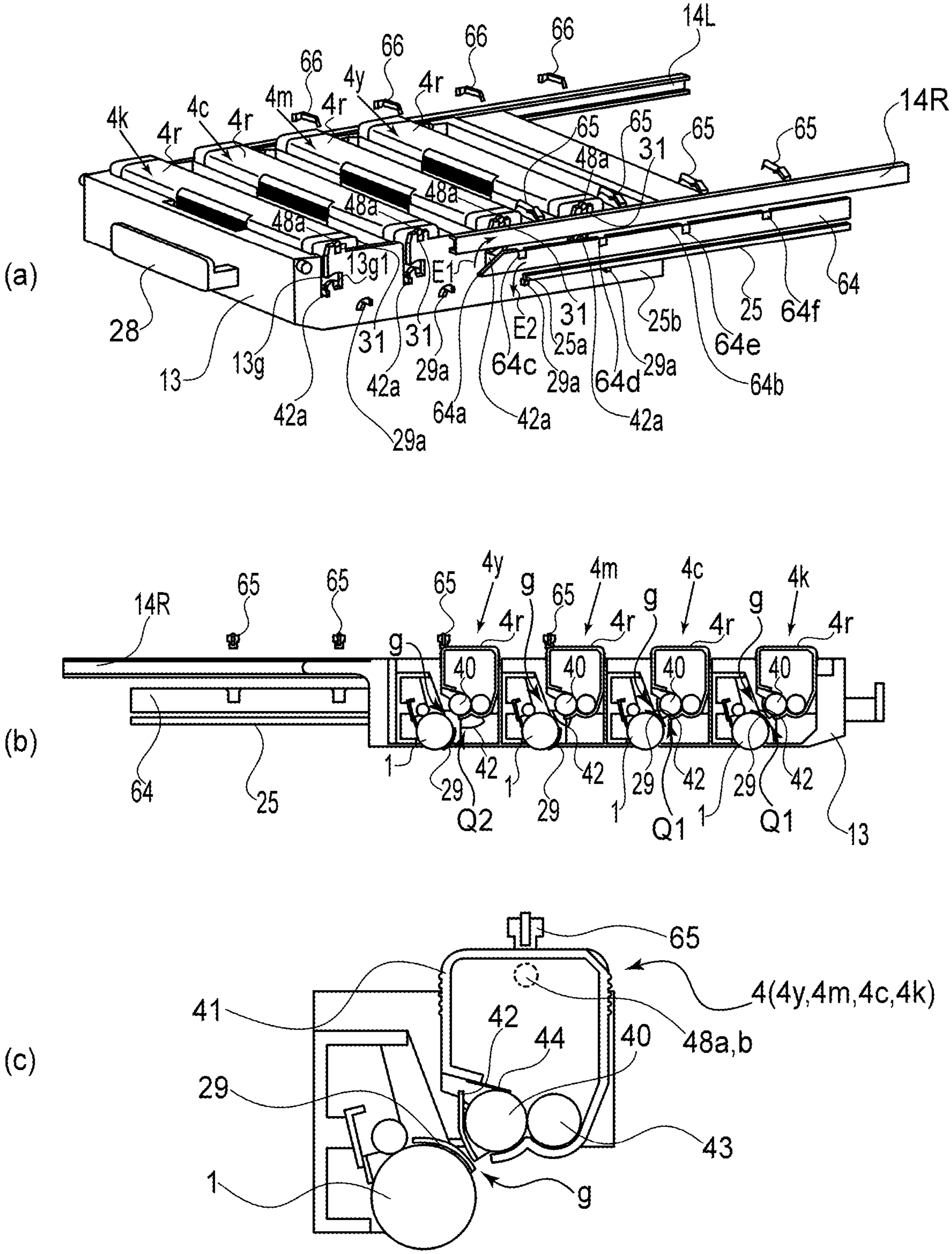
FIG. 9 is an illustration of the mounting of the drawer member to the inside of the main assembly according to Embodiment 1.
Figure 10:
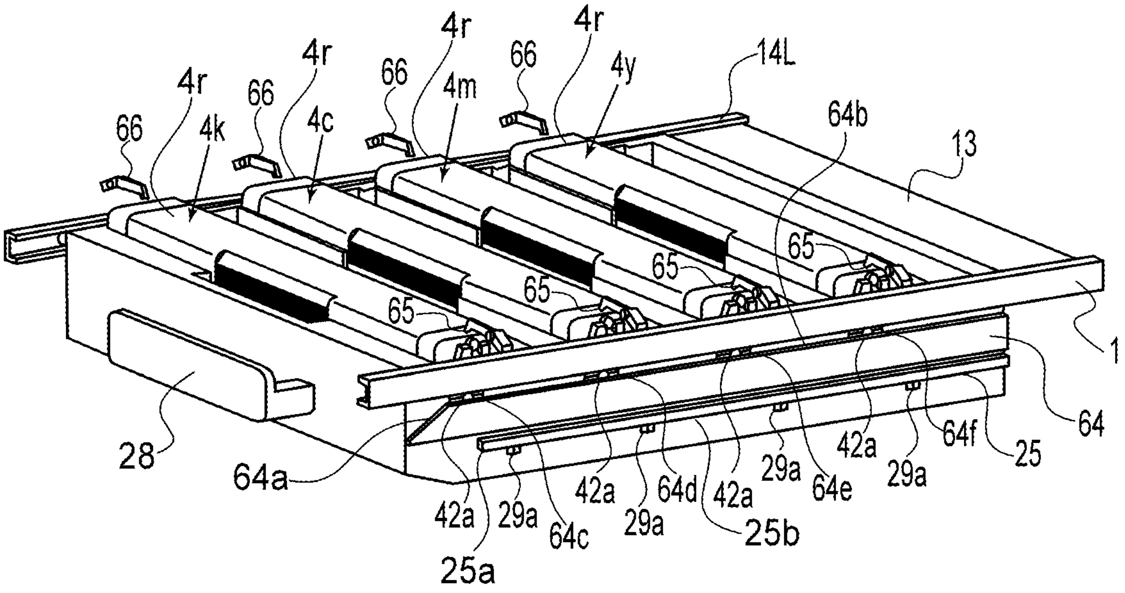
FIG. 10 is an illustration of the state that the drawer member is mounted to the inside of the main assembly according to Embodiment 1.
Figure 10:
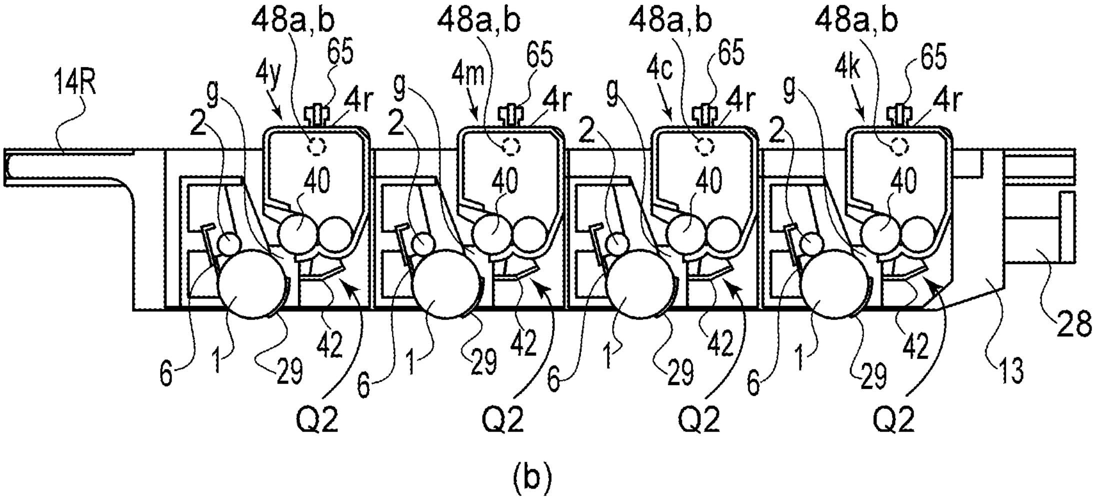

Referring to (b) of FIG. 8-(b) of FIG. 10, the description will be made as to a mounting operation of the drawer member 13 to the inside of the main assembly 100*a*. Here, (b) of FIG. 8 is a perspective view illustrating the state that the drawer member 13 is pulled out of the main assembly 100*a*. And, (a) of FIG. 9 is a perspective view illustrating the state in the course of the drawer member 13 being to the inside of the main assembly 100*a*. And, (b) of FIG. 9 is a sectional view illustrating the state in the course of the drawer member 13 being to the inside of the main assembly 100*a*. In addition, (c) of FIG. 9 is a partly enlarged view of (b) of FIG. 9. Additionally, (a) of FIG. 10 is a perspective view illustrating the state that the drawer member 13 is mounted to the inside of the main assembly 100*a*. Furthermore, (b) of FIG. 10 is a sectional view illustrating the state that the drawer member 13 is mounted to the inside of the main assembly 100*a*. In addition, in the FIGS. 9 and 10, only the members related to the mounting of the drawer member 13 is shown among the members in the main assembly side for better illustration.

Figure 11:
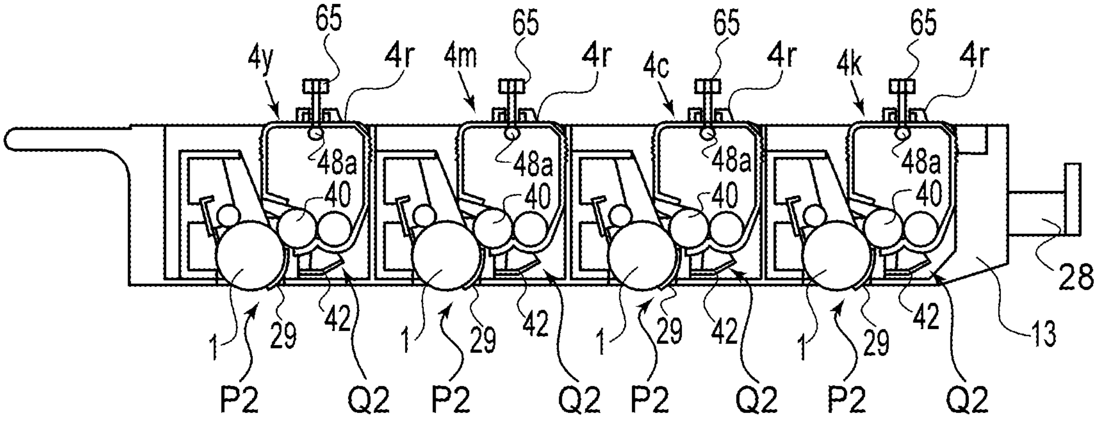
FIG. 11 is the illustration of the state after the completion of the positioning of the developing cartridge according to Embodiment 1.
Figure 11:
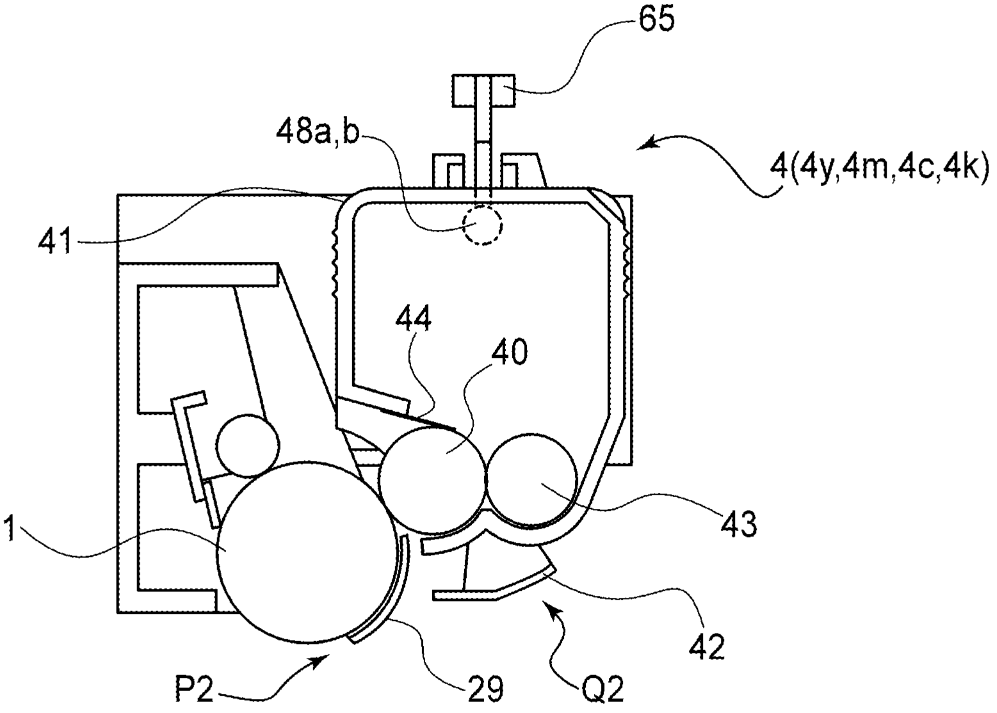

As has been described hereinbefore, the drawer member 13 is pushed in the direction indicated by an arrow D1 so that the portions-to-be-guided 13 (13*a*, 13*b*, 13*c*, 13*d*) provided on the drawer member 13 (FIG. 4) moves along the guiding members 14R and 14L ((a) and (b) of FIG. 2) provided in the main assembly 100*a*. In addition, it is pulled out in the direction indicated by an arrow D2. In response to the operation of pushing the drawer member 13 into the main assembly 100*a*, the force receiving portion 42*a* contacts to an inclined surface 64*a* which is the force applying portion provided on the guide 64 (FIG. 9). In response to the entering operation of the drawer member 13 to the inside of the main assembly 100*a*, the shutter 42 receives the force from the inclined surface 64*a* to rotate in the direction ((a) of FIG. 9) of an arrow E1 against the elastic force of the spring 49 ((c) of FIG. 6). The shutter 42 is rotated until the force receiving portion 42*a* reaches a flat surface portion 64*b* provided in the guide 64. And, in the state that the drawer member 13 is placed in the inside position I, each force receiving portion 42*a* is supported by the flat surface portion 64*b*. By this, in the state that the drawer member 13 is placed in the inside position I, the shutter 42 is placed in the retracted position Q2 (FIG. 11). The same applies to the shutter 29. In response to the operation of pushing in the drawer member 13 to the main assembly 100*a*, the shutter 29 is rotated from the protecting position P1 (*b*) of FIG. 3) for protecting the surface of the photosensitive drum 1 to the retracted position P2 (FIG. 11) that the portion of the photosensitive drum 1 to which the developing roller 40 is to contact is exposed. Thus, in response to the operation of pushing the drawer member 13 into the main assembly 100*a*, the force receiving portion 29*a* contacts to the end surface 25*a* of the shutter guide 25, so that the shutter 29 receives the force from the end surface 25*a*. And, the shutter 29 is rotated in a direction ((a) of FIG. 9) of the arrow E2. The shutter 29 is rotated until the force receiving portion 29*a* reaches to a flat surface portion 25*b* provided in the shutter guide 25. And, in the state that the drawer member 13 is placed in the inside position I, each force receiving portion 29*a* is supported by the flat surface portion 25*b*. By this, in the state that the drawer member 13 is placed in the inside position I, the shutter 29 is placed in the retracted position P2 (FIG. 11)).

Here, (b) of FIG. 9 shows the state in the course of the drawer member 13 being into the main assembly 100*a*. At this time, the shutter 42 of the cartridge 4*y* is in the retracted position Q2 to which the surface of the developing roller 40 is exposed. The shutter 42 of the cartridge 4*m* is in the position in the course of moving from the protecting position Q1 for covering the surface of the developing roller to the retracted position Q2 for the exposure. The shutters 42 of the cartridge 4*c*, 4*k* are in the protecting positions Q1. The same applies to the shutter 29. In the state that the drawer member 13 has been completely mounted to the inside of the main assembly 100, each shutter 42 of the cartridge 4 is in the retracted position Q2. The shutters 29 are also in the retracted position P2 that the portion of the photosensitive drum 1 to which the developing roller 40 is to contact is exposed (FIG. 11). Therefore, although the image forming apparatus 100 is provided with the shutters 29 and 42, the image can be formed on the sheet material S. A shutter guide 64 is securedly fixed along the movement direction of the drawer member 13 to an internal surface 100*b*1. The guide 64 is provided with the recesses 64*c*, 64*d*, 64*e*, 64*f* at regular intervals ((a) of FIG. 2). Furthermore, the shutter 42 is provided with the spring (elastic material) 49 which urges the shutter 42 toward the protecting position Q1 ((c) of FIG. 6). For this reason, in mounting the drawer member 13 to the inside of the main assembly 100*a* when the force receiving portion 42*a* approaches the entrances of the recesses 64*c*, 64*d*, 64*e* and 64*f*, the force receiving portions 42*a* enter partially into the recesses 64*c*-64*f* by the retracting force of the spring 49. However, the entrances of these recesses 64*c*-64*f* are provided with the inclinded surfaces (unshown) at both sides. For this reason, each force receiving portion 42*a* does not enter beyond necessity in the recess 64*c*-64*f*, but does not prevent a movement of the drawer member 13. In other words, when the force receiving portion 42*a* approaches the recess 64*c*-64*f*, it raised by the function of the inclinded surface provided at each entrance, and it can advance on the shutter guide 64 again. The recess 64*c*-64*f* is pressed by the urging member 65, 66 as will be described hereinafter, and when the cartridge 4 moves downwardly, the force receiving portion 42*a* does not prevent the movement thereof.

When the shutter 42 receives the force from the inclined surface 64*a* in accordance with the movement of the drawer member 13, the drawer member 13 receives the reaction force in the direction opposite from the mounting direction (arrow D1) by an urging force of the spring 49. However, the timing at which the force receiving portion 42*a* of the cartridge 4 receives a reaction force by contacting to the inclined surface 64*a* is different for every cartridge. For this reason, the force (mounting force) required to push the drawer member 13 is not remarkably large. Therefore, the user can move the drawer member 13 a relatively small force. In this embodiment, when the shutter 29 receives the force from the end surface 25*a* in accordance with the movement of the drawer member 13, the drawer member 13 receives the reaction force by the urging force of the spring 29*b* ((b) and (c) of FIG. 3)). However, in this embodiment, this timing is different for each the cartridge 4, and therefore, the pushing in force of the drawer member 13 is not remarkably large. In other words the drawer member 13 receives the reaction force by contacting to the inclined surface 64*a* and End surface 25*a*, but, once the shutters 42 and 29 move to the retracted position Q2 and P2, the force in the direction opposite the mounting direction is hardly produced, and therefore, the pushing in force of the drawer member 13 is not influenced. Each cartridge 4 (developing roller 40) is in the state that it spaces from the drum 1 in a process of the drawer member 13 being to the main assembly 100*a*. A gap g ((c) of FIG. 9, (b) of FIG. 10) is provided between the cartridge 4 (developing roller 40) and the photosensitive drum 1. For this reason, the shutter 42 is rotated, without interfering with the drum 1. Similarly, the shutter 29 is rotated, without interfering with the cartridge 4. According to this embodiment, in the state that the drawer member 13 is placed in the outside position O, the gap g is provided between the photosensitive drum 1 and the developing roller 40 so that the shutter 42 can be in the protecting position. This is because in the state that the drawer member 13 is placed in the outside position O, the longitudinal end portions of the cartridge 4 is raised by the supporting portions (spacer member) 31, 32. By this, the gap g is provided between the drum 1 and the developing roller 40. In this embodiment, the gap g is sufficiently large to place the shutter 29 in addition to the shutter 42. By this, according to this embodiment, the shutter 29 can be placed in the gap g. In addition, the developing roller 40 does not contact to the photosensitive drum 1 not only when the cartridge 4 is mounted to the drawer member 13 but when the drawer member 13 is pushed into the main assembly 100*a*. For this reason, the damage of the surfaces of the developing roller 40 and the photosensitive drum 1 by the vibration resulting from the mounting operation or the like can be suppressed.

<Positioning Structure of Developing Cartridge>

Referring to FIG. 11, the description will be made as to the structure for positioning the cartridge 4 relative to the main assembly 100*a*. FIG. 11 is a sectional view illustrating the state that the positioning of the cartridge 4 has been completed. In FIG. 11, among the members of the main assembly side, only the members relating to the positioning of the cartridge 4 are shown for better illustration. The cartridge 4 is moved from the position ((b) of FIG. 10) that the developing roller 40 spaces from the photosensitive drum 1 to the position ((a) of FIGS. 1, and 11) in which the developing roller 40 contacts to the drum 1 in interrelation with the operation for shutting the door 10. By this, the image formation is enabled. In this case, the drum 1 is contacted to the belt 11.

This interrelating mechanism will be described. As has been described hereinbefore, the main assembly 100*a* is provided with the urging members (contact mechanism) 65, 66. With the operation of shutting door (opening and closing member) 10 the urging members 65, 66 are moved downwardly to elastically press the upper surface 4*r* of the cartridge 4. By this, the cartridge 4 is positioned in the main assembly 100. The urging members 65, 66 are operated interrelatedly with an opening and closing operation of the door 10 by coupling means (this will be described hereinafter). In the state ((a) and (b) of FIG. 2) that the door 10 is open, the urging member 65, 66 is retracted to the position of not preventing the movement of the drawer member 13. Therefore, a mounting operation of the drawer member 13 is not disturbed. The drawer member 13 is placed in the inside position I and the door 10 is shut. By this, the urging members 65, 66 move the cartridge 4 downwardly against the elastic force of springs 32, 33.

Figure 12:
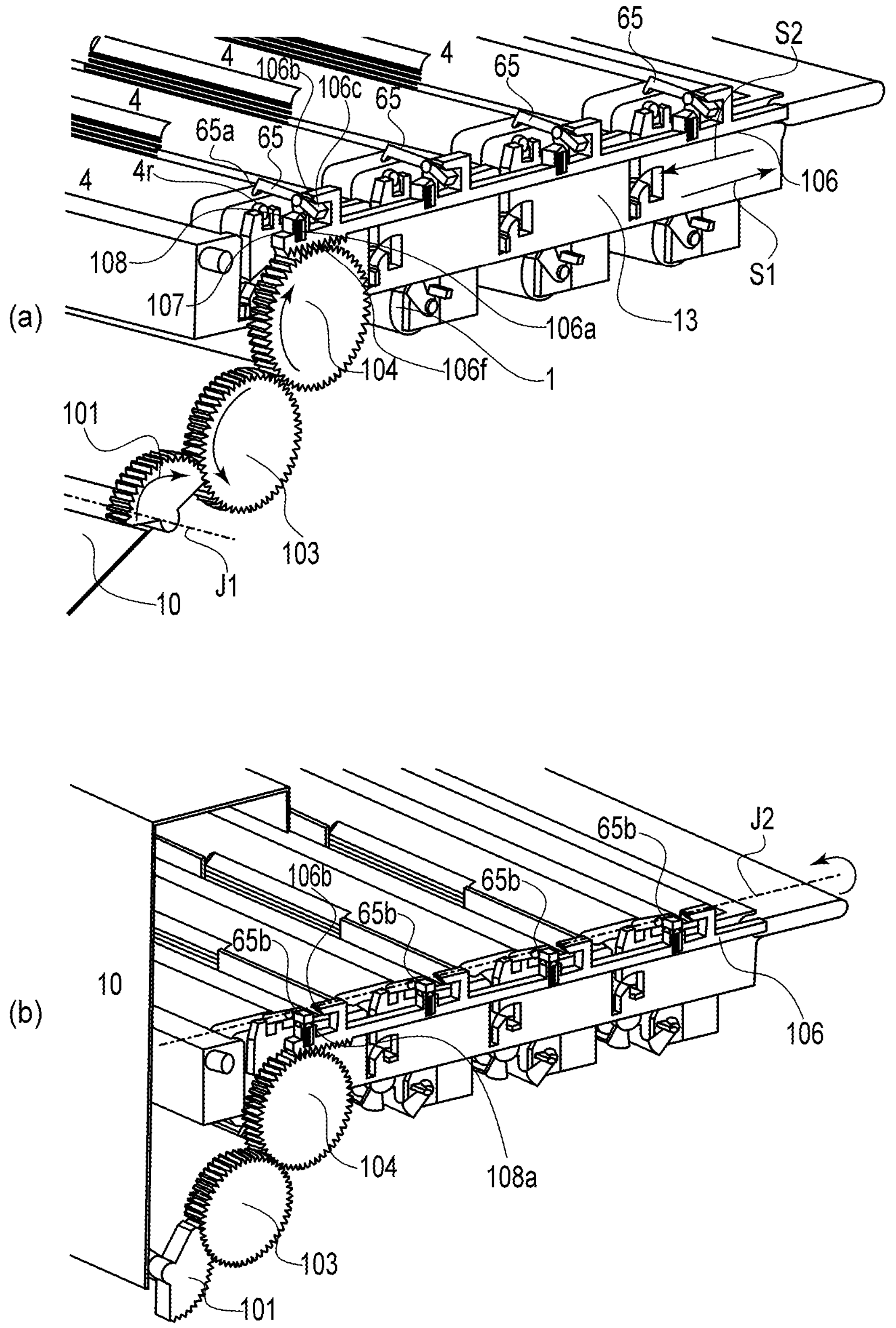
FIG. 12 is an illustration of an interrelating mechanism between a door and an urging member according to Embodiment 1.

Referring to FIG. 12, the description will be made as to the coupling means between the urging members 65, 66 and the door 10. The door 10 is open in (a) of FIG. 12, and the door 10 closes in (b) of FIG. 12. The structures other than the door 10, the urging member 65, and the coupling means between them or the like is omitted, for better illustration.

As shown in (a) of FIG. 12, the opposite ends, with respect to a direction of the rotation axis J1, of the door 10 are provided with the segment gear 101 (the other end portion is unshown)). The gear 101 is rotated in interrelation with the door 10. The gear 101 transmits a driving force to a rail unit 106 through an intermediate gear 103 and a transmission gear 104. The one-end portion of the unit 106 is provided with a rack portion 106*f* for engaging with the gear 104. Therefore, in response to the opening and closing operation of the door 10, the gears 103, 104 rotate in the direction indicated by the arrows to move the unit 106 in the arrows S1 and the directions of S2. The unit 106 is provided with an urging piece 108 mounted to a free end of the urging member 107 with an urging member 107 for pressing the urging members 65, 66. The urging member 107 and the urging piece 108 are accommodated in the recess 106*a* and are movable in the vertical direction. The downstream side, with respect to an inserting direction of the drawer member 13, of a recess 106*a* is provided with the force applying portion 106*b* for moving the urging member 65, 66 from the urging position (b) of FIG. 12) to the non-urging position ((a) of FIG. 12). The mechanisms of the urging members 65, 66 are common, and therefore, the description will be made only as to the mechanism of the urging member 65.

First, the door 10 is shut from the state of (a) of FIG. 12. The gear 101 moves the unit 106 in the direction of an arrow S1 through the gears 103, 104. The one-end portion 65*b* of the urging member 65 which is in the non-urging position (a) of FIG. 12) contacts to a tapered surface 108*a* provided on the urging piece 108, by which the urging member 65 is rotated in the direction indicated by an arrow about a rotation axis J2. An urging piece 65*a* provided at the other end of the urging member 65 elastically presses the upper surface 4*r* of the cartridge 4 by the rotating operation thereof, so that the cartridge 4 is positioned in the main assembly 100. The urging member 107 and the urging piece 108 are compressed in the recess 106*a* and the cartridge is pressed with the urging force corresponding to an amount of compression of the urging member 107. Here, the urging force of the urging member 107 is higher than the urging force of the spring 33, 34 provided in the drawer member, and therefore, the predetermined urging force can be produced. When the door 10 is opened after the end of the image forming operation, the gear 101 rotates the gears 103 and the gear 104 in the opposite direction. By this, the unit 106 is moved in a direction of the arrow S2. And, the one-end portion 65*b* of the urging member contacts to a force applying portion 106*b* which is a tapered surface provided on the unit 106 to rotate to the non-urging position shown in (a) of FIG. 12 about the rotation axis J2. The one-end portion 65*b* is accommodated in a recess 106*c* provided on the unit 106. The urging member 107 and the urging piece 108 return to the previous positions, respectively. The cartridge 4 (developing roller 40) released from the urging forces of the urging members 65, 66 is again spaced from the photosensitive drum 1 by the urging force of the spring 33, 34. As has been described hereinbefore, the longitudinal opposite end portions of the cartridge 4 is provided with the projections 48*a*, 48*b* ((a) and (b) of FIG. 6). And, the urging member 65, 66 presses (widthwise direction of the cartridge 4) the upper surface 4*r* of the cartridge corresponding to the projections 48*a*, 48*b* 4 downwardly (FIG. 10)). By this urging force (elastic force) the projections push downwardly the supporting portions 31 and 32 (FIGS. 6 and 7) against the elastic force of the spring (elastic material) 33, 34 48*a*, 48*b*. By this, the portions-to-be-guided 46 and 47 ((a) and (b) of FIG. 7) provided at the end of the cartridge 4 move downwardly along the guide portions 13*i*, 13*j*. Finally, the portion-to-be-guided (46, 47) is stopped by the positioning portions 13*i*1, 13*j*1. In this state, the developing roller 40 is contacted to the photosensitive drum 1. And, the image formation is possible ((a) of FIG. 1). In other words, the urging members (contact mechanisms) 65, 66 release a spacing state between the surface of the developing roller 40 and the surface of the photosensitive drum 1 by the supporting portions (spacing mechanism) 31, 32. And, the urging members 65, 66 contact those surfaces to each other. The widthwise direction of the cartridge 4 is the direction (the direction perpendicular to the developing roller 40) perpendicular to the longitudinal direction of the cartridge 4.

The guide 64 is provided with the recesses 64*c*-64*f* at regular intervals as shown in (a) of FIG. 2 and (a) of FIG. 9. A part of opening 13*g* is provided with a clearance 13*g*1. The recesses 64*c*-64*f* and the clearance 13*g*1 is provided so that the force receiving portion 42*a* may not prevent the movement thereof at the time of moving downwardly by pressing the cartridge 4 by the urging members 65, 66. When the cartridge 4 is pressed downwardly by the urging members 65, 66, the force receiving portion 42*a* is moved in the recesses 64*c*, 64*d*, 64*e*, 64*f* and the clearance 13*g*1. Therefore, the movement of the cartridge 4 is not prevented. Furthermore, the shutter 42 does not deviate greatly from the exposing position.

As has been described in the foregoing, when the door 10 is closed, the state that the image formation is possible is established and the image forming operation through the image formation process described above is possible. In addition, the transfer belt 11 is retracted by spacing means (unshown) so that it does not rub with the photosensitive drum 1 at the time of a movement of the drawer member 13. And, when the door 10 is closed the spacing state is released and the photosensitive drum 1 is contacted to the transfer belt 11.

<Removing Operation of Developing Cartridges>

The exchange of the cartridge 4 will be described. The exchange of the cartridge 4 is carried out when the toner is consumed up, for example. In the case where the cartridge 4 is dismounted from the main assembly 100*a*, first, the door 10 is opened. By this, the pressing to the projection 48*a*, 48*b* by the urging members 65, 66 is released. By this, the cartridge 4 is moved upwardly by the elastic force of the springs 33, 34 (FIG. 10)). The user pulls the drawer member 13 out in the direction (b) of FIG. 1) of the arrow D2 from the main assembly 100*a*. In the drawing process of the drawer member 13, when the force receiving portion 42*a* passes by the end 64*a* of the shutter guide 64, the shutter 42 returns to the protecting position Q1 by the elastic force (urging force) of the spring 49. The same applies to the shutter 29. More particularly, when the force receiving portion 29*a* passes by the end 25*a* of the shutter guide 25, the shutter 29 returns to the protecting position P1 by the elastic force (urging force) of the spring (elastic material) 29*b*.

In this manner, by pulling out the drawer member 13, all the shutters 42, 29 return to the protecting position (the position)). By this, in the state that the drawer member 13 is placed in the outside position O, the developing roller 40 and the photosensitive drum 1 are protected. In this state, by raising the cartridge 4, the user can dismount the cartridge 4 from the drawer member 13. In this case, by the supporting portions 31, 32, the developing roller 40 and the photosensitive drum 1 are separated from each other with the gap g. This is as has been described hereinbefore.

As has been described in the foregoing, according to the image forming apparatus 100 according to the present embodiment, an a plurality of cartridge 4 can be mounted to the inside of the main assembly 100*a* all together by the drawer member 13, and they can be pulled out all together to the outside of the main assembly. And, the cartridge 4 is provided with the shutter 42 movable between the protecting position Q1 for covering the surface of the developing roller and the retracted position Q2 in which the surface of the developing roller 40 is exposed. The shutter 42 is in the protecting position Q1, in the free-state of the cartridge 4, and in the state that the drawer member 13 is placed in the outside position O of the main assembly 100*a*. Therefore, at the time of an operation of mounting and demounting the cartridge 4 relative to the drawer member 13, the user cannot touch inadvertently on the surface of the developing roller 40. Accordingly, the operativity at the time of the exchange of the cartridge 4 is improved. In addition, at the time, for example, of the exchanging operation of the cartridge 4, the damage of the surface of the developing roller 40 can be suppressed. In addition, in the state where the cartridge 4 is mounted to the drawer member 13 the shutter 42 is operated interrelatedly with the moving operation of the drawer member 13. More particularly when the drawer member 13 moves from the outside position O to the inside position I, the shutter 42 is moved from the protecting position Q1 to the retracted position Q2 in interrelation with this movement. When the drawer member 13 moves from the inside position I to the outside position O, the shutter 42 is moved from the retracted position Q2 to the protecting position Q1 in interrelation with this movement. In this manner, the opening and closing operation of the shutter 42 can be automatically carried out by a moving operation of the drawer member 13 by the user. Therefore, the user does not have to do an opening and closing operation for the shutter 42. In addition, in this embodiment, the shutters 42 which are provided in four cartridges 4, respectively move at the different timing. More particularly in the process in which the drawer member 13 moves from outside position O to the inside position I, the shutter 42 is moved in order of the cartridge 4*y*, the cartridge 4*m*, the cartridge 4*c*, and the cartridge 4*k*. Therefore, although the force for moving the shutter 42 is required in addition to the force for pushing in the drawer member 13, the mounting operation property of the drawer member 13 is not deteriorated. This is because the four shutters 42 are not simultaneously moved. In addition, in this embodiment, in the state where the cartridge 4 is mounted to the drawer member 13, the supporting portion (contacting and spacing mechanism) for contacting and spacing the drum 1 and the developing roller 40 with each other is provided. More particularly, in the state that the drawer member 13 is in the outside position O, the drum 1 and the developing roller 40 are spaced from each other. In addition, according to this embodiment, even if it in the state where the drawer member 13 is placed in the inside position I, the drum 1 and the developing roller 40 are spaced from each other in the state that the door 10 is open. When the drawer member 13 is mounted to the inside of the main assembly, and the door 10 is closed, the drum 1 and the developing roller 40 are contacted to each other. Therefore, at the time, for example, of the mounting and dismounting operation of the developing cartridge 4, the damage of the surface of the drum 1 and the surface of the developing roller 40 can be suppressed. In addition, said gap g can be provided so that the shutters 29, 42 can move from the retracted positions P2, q2 to the protecting positions P1, q1. More particularly, the shutters 29, 42 can be placed in the retracted positions P2, q2. In addition, in this embodiment, the shutter 29 which is movable between the protecting position P1 and the retracted position P2 is provided. The shutter 29 is in the protecting position P1 in the state that the drawer member 13 is pulled out of the main assembly 100*a*. The portion which the shutter 29 covers is the portion above the horizontal plane L through main O of the drum 1 and is the contact surface, to the developing roller 40, of the peripheral surface of the drum 1 ((a) of FIG. 3). In addition, in the present embodiment, the cartridge 4 is in the spaced position in the state where it mounted to the drawer member 13. Here, the spaced position is the position that the drum 1 and the cartridge 4 are separated from each other ((b) and (c) of FIG. 1, (b) and (c) of FIGS. 9, and 10). Here, the photosensitive drum 1 and the developing roller 40 are separated from each other. Furthermore, the cartridge 4 is mounted downwardly along the gravity on the drawer member 13. Therefore, at the time, for example, of the mounting operation of the cartridge 4, the damage of the surface of the drum 1 is suppressed, with the fact that the cartridge 4 is mounted with the spaced position on the drawer member 13 as has been described hereinbefore. According to this embodiment, even when the foreign matter falls to the surface of the drum 1 in the process of the mounting operation, the shutter 29 can prevent it. According to this embodiment, since the upper side above the horizontal plane L is covered, the influence of the falling object is reduced.

The shutter 29 works, also in the case where the shutter 42 which covers the surface of the developing roller 40 is not provided. In addition, the region of the drum 1 which the shutter 29 covers may not be the entirety of the upper side, above a horizontal plane L through centerline (axis) 0, of the drum 1, but partial covering is effective. As has been described hereinbefore, according to the device 100 of the present invention, the exchanging operation of the cartridge 4 is very simple. Moreover, at the time of the exchanging operation, the damage of the developing roller 40 is suppressed.

<Others>

In Embodiment 1, the drum 1 and the charging member 2 are mounted to the drawer member 13 rotatably, and the cleaning member 6 is mounted to it. More particularly, these are mounted to the drawer member 13 so that they cannot be dismounted by the user. However, the present invention can be applied to the structure in which these parts can be unified into a cartridge form, and the user can exchange it. In Embodiment 1, the shutter 29 for protecting the surface of the drum 1 is provided. However, the present invention can be applied to the device which is not provided with the shutter 29. Or, the present invention can be applied to the structure which is provided with the shutter 29 and is not provided with the shutter 42.

Embodiment 2

Figure 13:
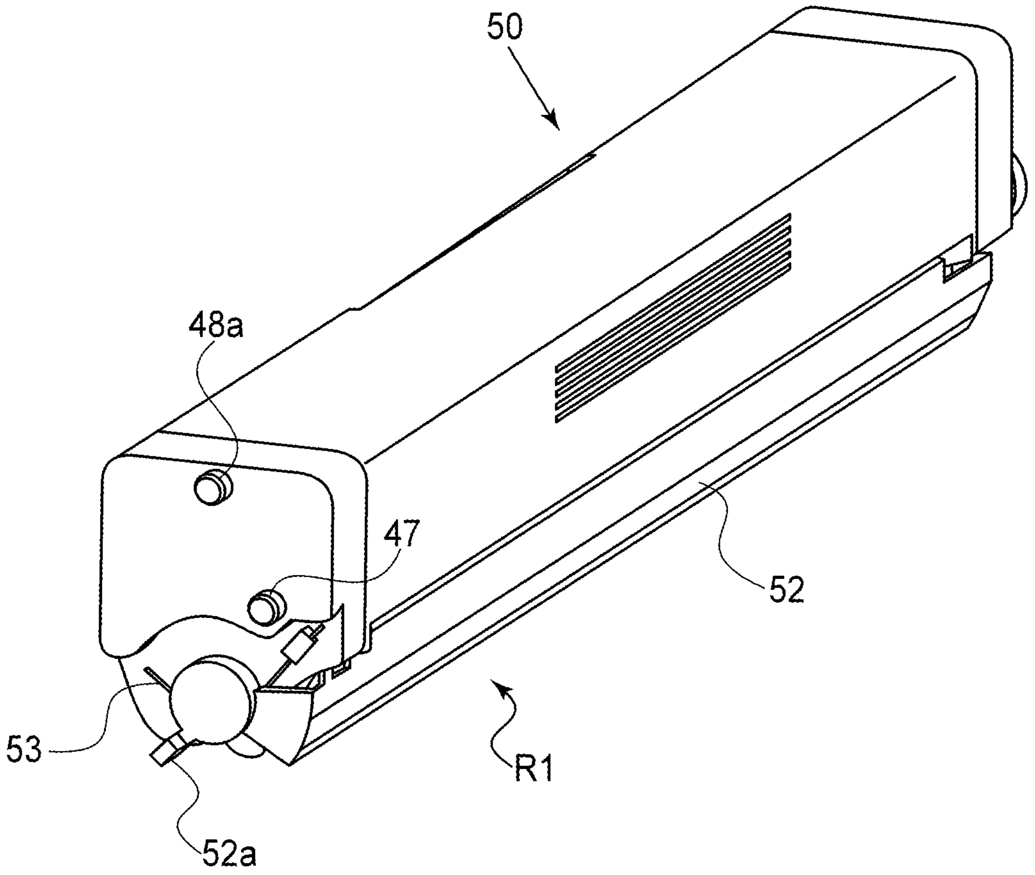
FIG. 13 is a perspective view of the developing cartridge according to Embodiment 2.
Figure 14:
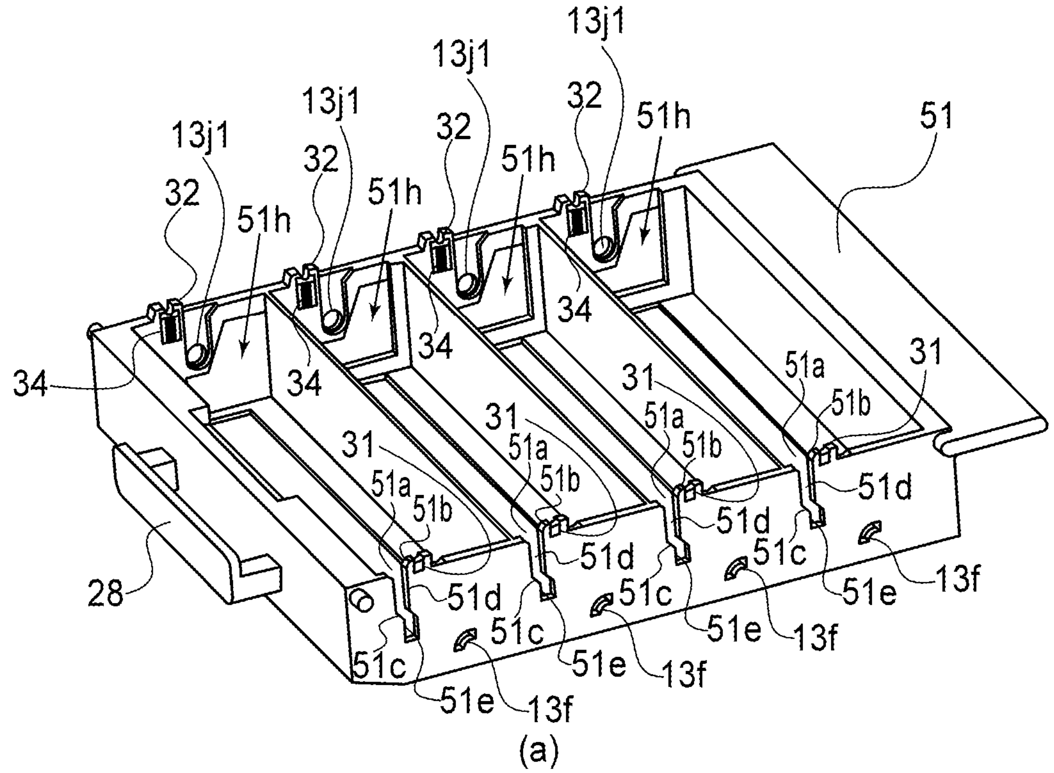
FIG. 14 is a perspective view of the drawer member according to Embodiment 2.
Figure 14:
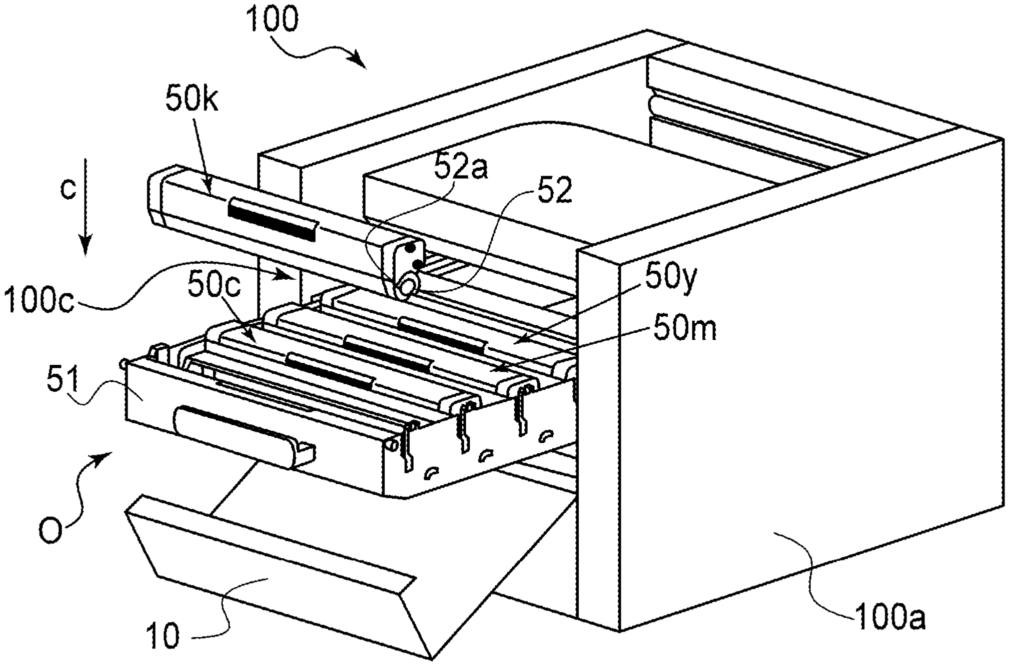
Figure 15:
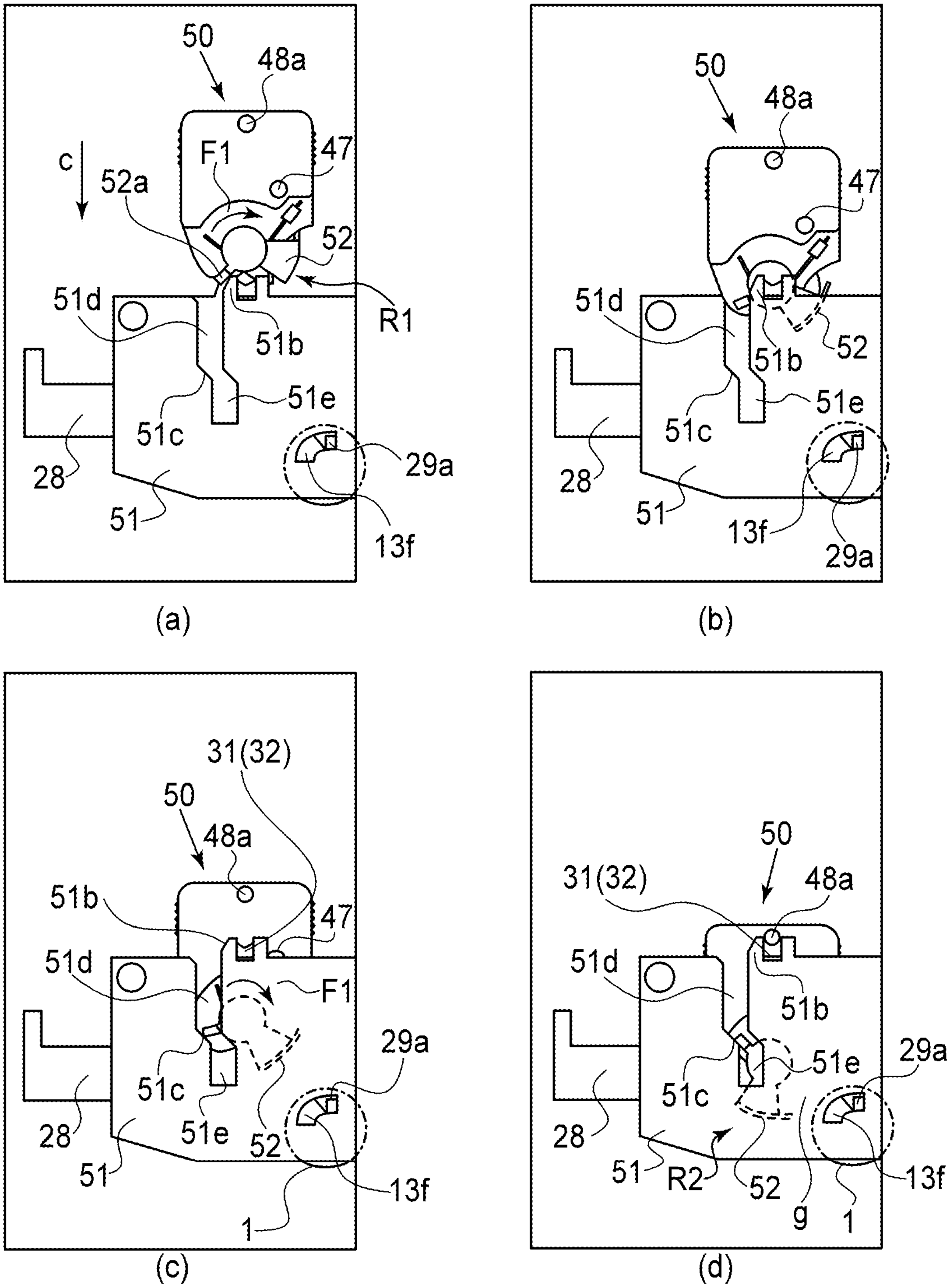
FIG. 15 is a view illustrating a mechanism in the case of the mounting of the developing cartridge according to Embodiment 2.
Figure 16:
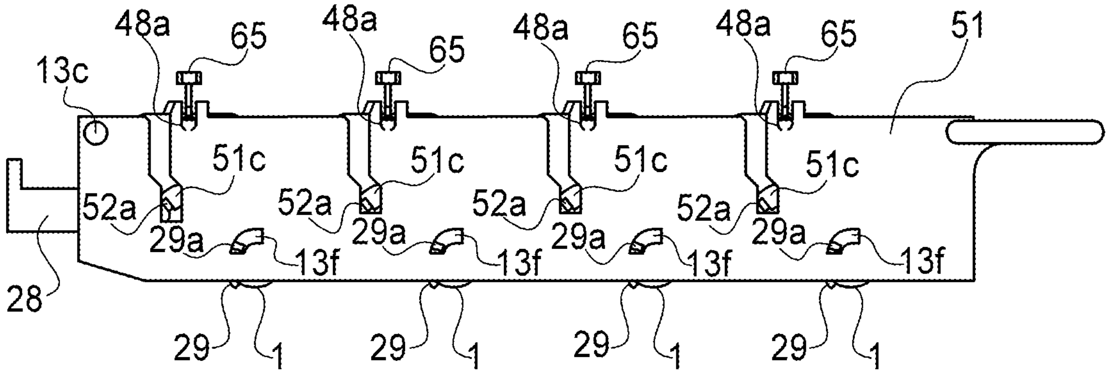
FIG. 16 is a view illustrating the state after the completion of the positioning of the developing cartridge according to Embodiment 2.
Figure 16:
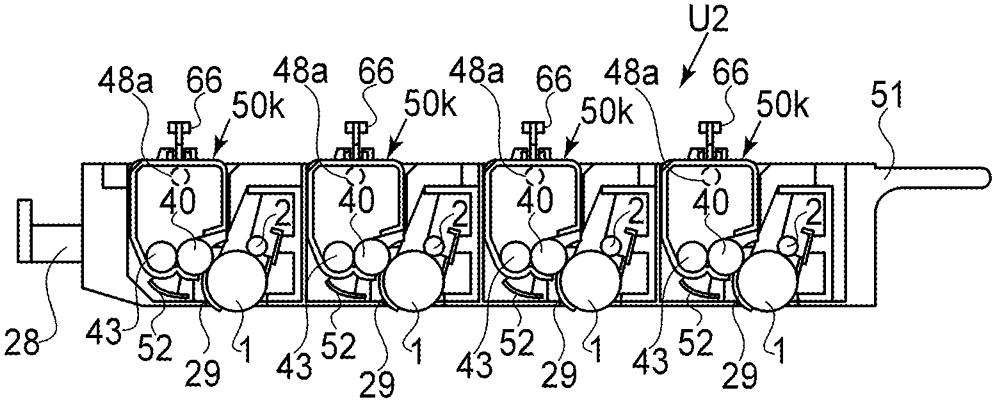

Referring to (b) of FIG. 13-FIG. 16, Embodiment 2 of the present invention will be described. In Embodiment 1, the shutter 42 operates interrelatedly with the movement of the drawer member 13. In this embodiment, an opening and closing of the shutter for protecting the developing roller is done interrelatedly with the mounting and demounting operation of the cartridge relative to the drawer member. The like reference numerals as in the foregoing embodiments are assigned to the elements having the corresponding functions FIG. 13 is a perspective view of the developing cartridge according to Embodiment 2. And, (a) of FIG. 14 is a perspective view of the drawer member according to Embodiment 2. Here, (b) of FIG. 14 is a perspective view illustrating the state of mounting the developing cartridge to the drawer member. In (b) of FIG. 14, the structures of the main assembly are schematically shown for better illustration. FIG. 15 shows the mechanism at the time of mounting the developing cartridge to the drawer member. Here, (a) of FIG. 16 is a side view illustrating the state that the positioning of the developing cartridge completes. Here, (b) of FIG. 16 is a sectional view illustrating the state that the positioning of the developing cartridge completes. In (a) and (b) of FIG. 16, as for the members of the main assembly side, only the members related to the positioning of the developing cartridge are shown for better illustration.

The present embodiment is different from Embodiment 1 in that a shutter 52 for protecting the surface of the developing roller 40 is operated interrelatedly with the operation of mounting and demounting the developing cartridge 50 relative to the drawer member 51.

As shown in FIG. 13, the shutter 52 for protecting the surface of the developing roller 40 is extended in the longitudinal direction so that it covers the entire longitudinal range of the developing roller 40. Similarly to Embodiment 1, the shutter 52 is supported rotatably within the predetermined range, and it is movable between a protecting position R1 for covering the surface of the developing roller 40 (*a*) of FIG. 15) and a retracted position R2 ((c) of FIG. 15) where the surface of the developing roller 40 is exposed. The shutter 52 is urged toward the protecting position by the elastic force of spring (elastic material) 53, and the shutter 52 is maintained in the protecting position R1 unless an external force is applied. At the one longitudinal end portion (one longitudinal end portion of the developing roller 40) of the shutter 52, a force receiving portion 52*a* projects longitudinally outwardly. The force receiving portion 52*a* receives the force from the inclined surface (force applying portion) 51*b*, 51*c* provided on the drawer member 51 to move the shutter 52 to the retracted position R2 against the elastic force of a spring 53.

As shown in (a) of FIG. 14, the side of the drawer member 51 is provided with an opening 51*a* which the force receiving portion 52*a* enters. The opening 51*a* is provided with the inclined surfaces (force applying portions) 51*b*, 51*c*. The lower portion of an inclined surface 51*b* is provided with a linear portion 51*d* extended linearly. The lower portion of an inclined surface 51*c* is provided with a linear portion 51*e* extended linearly. The a cartridge 50 according to the present embodiment (50*y*, 50*m*, 50*c*, 50*k*) is mounted to the corresponding mounting portion 51*h* provided on the drawer member 51. Also in this embodiment, in the state that the drawer member 51 is placed in the outside position O of the main assembly 100*a*, the cartridge 50 is mounted by the user. More particularly, the cartridge 50 is mounted downwardly substantially to the drawer member 51 (the direction of arrow C in ((b) of FIG. 14 i.e. the direction of gravity). The cartridge 50 is dismounted from the drawer member 51 in the opposite direction.

Referring to FIG. 15, the mechanism for mounting the developing cartridge 50 to the drawer member 51 will be described. The user mounts the cartridge 50 to the drawer member 51 in the direction of arrow C. In this case, first, the force receiving portion 52*a* abuts to the inclined surface 51*b*. By further moving the cartridge 50 in the direction of arrow C, the shutter 52 receives the force from the inclined surface 51*b* to start the movement in the direction of an arrow F1 (*a*) of FIG. 15)). When the cartridge 50 is moved further downwardly, the force receiving portion 52*a* passes the inclined surface 51*b* to reach the linear portion 51*d*. The shutter 52 is moved downwardly by the elastic force (urging force) by the spring (elastic material) 53 while the force receiving portion 52*a* slides on a side of the linear portion 51*d* ((b) of FIG. 15). Thereafter, the force receiving portion

52*a* is contacted to the inclined surface 51*c*, and the shutter 52 further moves in the direction of the arrow F1 ((c) of FIG. 15).

Until the projection 48*a* finally abuts to the supporting portion 31 provided on the drawer member 51, the cartridge 50 is moved ((c) of FIG. 15). Also while the force receiving portion 52*a* moves on the linear portion 51*e*, the shutter 52 is further rotated toward a retracted position R2. And, the shutter 52 is stopped at the position shown in FIG. 15(*c*). This position is the retracted position R2 of the shutter 52. At this time, the force receiving portion 52*a* is contacted to the inclined surface 51*c* by the elastic force of the spring 53. In this manner, the shutter 52 is moved to the retracted position R2, and is maintained in the state thereof. Similarly to Embodiment 1, at the time of the operation of the shutter 52, each developing roller 40 maintains the state of spacing from the drum 1. Therefore, the shutter 52 is moved, without interfering with the drum 1 (rotation). Similarly, the shutter 29 is moved, without interfering with the cartridge 4 (rotation). The structure for the spacing and contact between the drum 1 and the developing roller 40 is the same as Embodiment 1. In this embodiment, by the provision of the supporting portions 31, 32, the inclined surface 51*b*, the inclined surface 51*c*, and the linear portion 51*d* and so on can be disposed adjacent to the drum 1. Therefore, the height of the drawer member 51 can be decreased. When the supporting portions 31, 32 are not provided, it necessary to rotate the shutter 52 at the position remote from the surface of the drum 1. This is to avoid the interference between the shutter 52 and the drum 1. Without the supporting portions 31, 32, it necessary to place the portion (inclined surface 51*b*, inclined surface 51*c*, and portion 51*d*) for contacting to the shutter 52 and rotating the shutter 52 in the position remote from the drum 1. In such a case, it necessary to upsize the drawer member 51. However, according to this embodiment, the supporting portions 31, 32 are provided, and therefore, it not necessary to upsize the drawer member 51 remarkably. According to this embodiment, the developing roller 40 does not contact to the drum 1 during the mounting operation of the drawer member 51. For this reason, the damage, attributable to the vibration resulting from the mounting operation and so on, of the surfaces of the developing roller 40 and the drum 1 can be suppressed. In addition, the drawer member 51 is mounted to the inside of the main assembly 100*a* in the state that all the cartridges 50 are mounted to the drawer member 51. In the process in which the drawer member 51 enters in the main assembly 100*a*, the shutter 29 is moved from the protecting position P1 to the retracted position P2. The structure therefor is the same as with Embodiment 1.

In interrelation with the closing operation of the door 10, the urging members 65, 66 are moved downwardly to press the upper surface of the cartridge 50. By this, the cartridge 50 moves downwardly. At this time, the developing roller 40 is moved from the position spaced from the drum 1 to the position of contacting to the drum 1.

Here, (a) and (b) of FIG. 16 shows the state when the developing roller 40 contacts to the photosensitive drum 1. At this time, the force receiving portions 52*a* are placed in the linear portion 51*c*, and at this time, the shutter 52 is in the retracted position. Here, (b) of FIG. 16 is a sectional view of the drawer unit U2 and the cartridge 50. The drum 1 and the developing roller 40 contact to each other in the state of this Figure, and the image formation are possible. At this time, the drum 1 and the belt 11 contact with each other.

By the structure as described above, also in this embodiment, the effects similar to Embodiment 1 are provided. In this embodiment, the shutter 52 is operated interrelatedly with a mounting and demounting operation of the cartridge 50 relative to the drawer member 51. More particularly, in the process in which the cartridge 50 is mounted to the drawer member 51, the shutter 52 is moved from the protecting position R1 to the retracted position R2 in interrelation with the mounting operation. On the contrary, in the process in which the cartridge 50 is dismounted from the drawer member 51, the shutter 52 is moved from the retracted position R2 to the protecting position R1 in interrelation with this dismounting operation. When the cartridge 50 is dismounted from the drawer member 51, the shutter 52 returns to the previous position (protecting position R1)). This is because the shutter 52 is urged toward the protecting position R1 direction by the elastic force of the spring (elastic material) 53. In this manner, according to this embodiment, the opening and closing operation of the shutter 52 is automatically carried out by the mounting and dismounting operation of the cartridge 50 relative to the drawer member 51. Therefore, the user does not need to carry out the opening and closing operation of the shutter 52. In this manner, also in this embodiment, the similar effect as in the case of Embodiment 1 is provided. In addition, in the present embodiment, in moving the drawer member 51 the force for moving the shutter 52 is unnecessary. For this reason, in this embodiment, the force required when carrying out the moving operation of the drawer member 51 is small as compared with the case of Embodiment 1. In the state that the cartridge 50 is mounted to the drawer member 51, the developing roller 40 is spaced from the photosensitive drum 1. They are contacted to each other in interrelation with the closing operation of the door 10 in the state where the drawer member 51 is placed in the inside position I. The mechanism for contacting and spacing them is the same as Embodiment 1. Therefore, the functional effects with respect to this contacting and spacing mechanism are the same as those of Embodiment 1.

Embodiment 3

Referring to FIG. 17 and FIG. 18, Embodiment 3 of the present invention will be described. The photosensitive drum, the charging member, the cleaning member, and so on are fixed to the drawer member in Embodiment 1. In this embodiment, these are provided in the main assembly (100*a*) and only the developing cartridge is mounted to the drawer member. The like reference numerals as in the foregoing embodiments are assigned to the elements having the corresponding functions.

Here, (a) of FIG. 17 shows an image forming apparatus according to Embodiment 3, and is a sectional view illustrating the state that the drawer member is pulled out. And, (b) of FIG. 17 is a sectional view illustrating the state that the drawer member is mounted in the main assembly and the door is opened in the image forming apparatus according to Embodiment 3. FIG. 18 is a sectional view of the image forming apparatus according to Embodiment 3.

The present embodiment is different the above described Embodiment 1 in that the photosensitive drum 81, the charging member (charging roller) 82 and the cleaning member (cleaning blade) 83 are provided in the main assembly 100*a*. Therefore, the developing cartridges 84 (84*y*, 84*m*, 84*c*, 84*k*) are mounted on a drawer member 80.

Also in this embodiment, in the state that the drawer member 80 is placed in the outside position O, a cartridge 84 is mounted to the drawer member 80. Similarly to the case of Embodiment 1, at this time, a shutter 85 provided on the cartridge 84 is in the protecting position Q1 ((a) of FIG. 17).

In the state where the cartridge 84 is mounted to the drawer member 80, the drawer member 80 is pushed into the main assembly 100*a* (the direction of the arrow D1 in ((a) of FIG. 17). When the drawer member 80 is moved in a pushing in direction, the shutter 85 moves in interrelation with the moving operation of the drawer member 80. More particularly, the main assembly 100*a* is provided with a developing roller shutter guide 87, and moves the shutter 85 from the protecting position Q1 ((a) of FIG. 17) to the retracted position Q2 ((b) of FIG. 17)). This is the same as the structure of Embodiment 1. The shutter 85 corresponds to the shutter 42, and the shutter guide 87 corresponds to the shutter guide 64. In the present embodiment, a drum 81, a charging member 82, and a cleaning member 83 is provided below a passing range of the cartridge 84 mounted to the drawer member 80 and the drawer member 80 ((a) and (b) of FIG. 17). For this reason, these members do not prevent the movement of the drawer member 80. After mounting the drawer member 80 to the inside of the main assembly 100*a*, when the door 10 is closed, the drawer member 80 is moved downwardly by the coupling means (unshown) (the member 80 is lowered from the position shown in ((b) of FIG. 17). By this, the a developing roller 86 provided in the cartridge 84 contacts to the drum 81 and the image forming operation is enabled (FIG. 18). Here, the drum 81 is in contact with the belt 11. The cartridge 84 is provided with the shutter 85 movable between the protecting position Q1 and the retracted position Q2. The shutter 85 is in the protecting position Q1 the state that the cartridge 84 is free, and, the state that the cartridge 84 is only mounted to the drawer member 80 pulled out outside the main assembly 100*a*. Therefore, it suppressed that the user contacts inadvertently to the surface of the developing roller 86 when the cartridge 84 is mounted and demounted relative to the drawer member 80. In addition, the damage of the surface of the developing roller 86 is suppressed at the time, for example, of an exchanging operation of the cartridge 84. In addition, also in this embodiment, the opening and closing of the shutter 85 is operated interrelatedly with the moving operation of the drawer member 80 in the state where the cartridge 84 is mounted to the drawer member 80. This is similar to the case of Embodiment 1. Therefore, the opening and closing operation of the shutter 85 can be automatically carried out by the moving operation of the drawer member 80. Accordingly, the user does not have to do the opening and closing operation of the shutter 85. In addition, in this embodiment, the photosensitive drum 81 and the developing roller 86 are spaced from each other the state that the drawer member 80 is pulled out outside the main assembly 100*a*, and in the state that the drawer member 80 is mounted to an inside of the main assembly 100*a* and the door 10 is open. When the drawer member 80 is mounted to the inside of the main assembly 100*a*, and the door 10 is closed, the drum 81 and the developing roller 86 are contacted relative to each other. Therefore, in mounting and demounting the cartridge 84 relative to the drawer member 80 the damage of the surface of the drum 81 and the surface of the developing roller 86 is suppressed. Similarly to the case of Embodiment 1, in this embodiment, the shutter 85 is moved in interrelation with the movement of the drawer member 80. As shown in Embodiment 2, however, in the structure that the photosensitive drum 81 is provided in the main assembly (100*a*) side, the structure that the opening and closing of the shutter for protecting the surface of the developing roller is operated interrelatedly with the mounting and demounting operation, relative to the drawer member, of the cartridge can also be employed.

Embodiment 4

Referring to (a) and (b) of FIG. 19, and (a), (b) and (c) of FIG. 20, Embodiment 4 of the present invention will be described. In Embodiment 1, the opening and closing of the drum shutter is operated interrelatedly with the movement of the drawer member. In this embodiment, the opening and closing of the drum shutter are done interrelatedly with the mounting and demounting operation, relative to the drawer member, of the developing cartridge.

Figure 19:
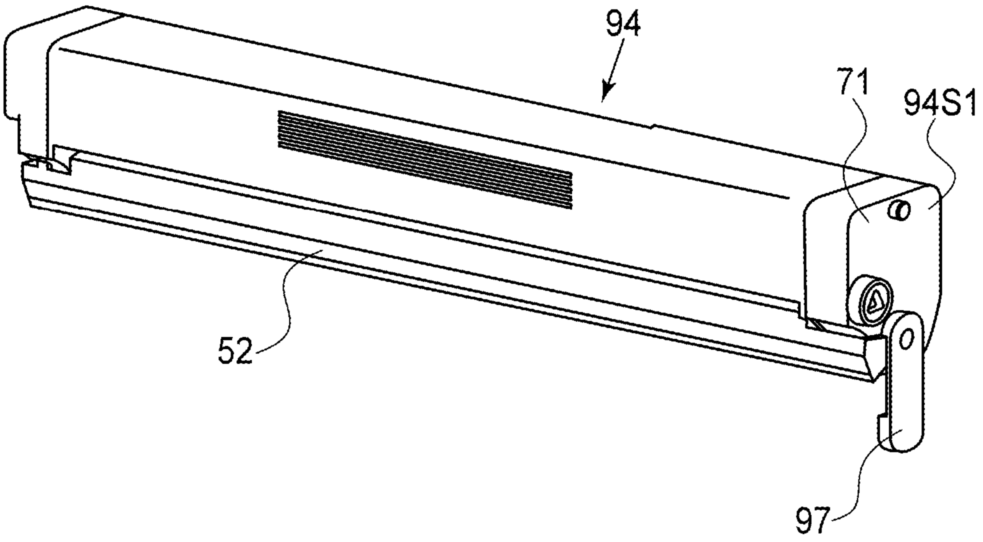
FIG. 19 is an illustration of the developing cartridge according to Embodiment 3.
Figure 19:
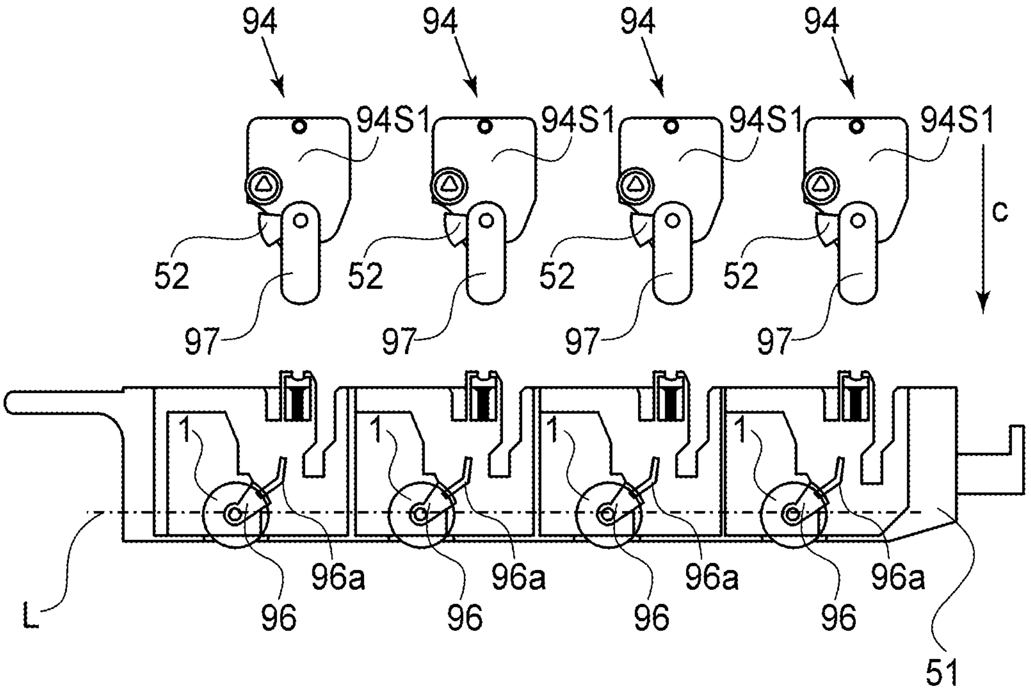

A developing cartridge 94 of the present embodiment is shown in (a) of FIG. 19. The present embodiment is different from Embodiment 1 in that at the end of a cartridge 94 the projection (force applying portion) 97 for receiving a force for releasing a drum shutter 96 from the main assembly 100*a* is provided.

A projection 97 projects toward the downstream side with respect to the mounting direction (downward, the direction of arrow C in (b) of FIG. 19) of mounting the cartridge 94 to the drawer member 51. The projection 97 is disposed the longitudinally outside of the shutter 52 at the one longitudinal end (the direction of the developing roller) of the cartridge 94. The projection 97 is fixed to a side cover 94*s*1.

Here, (b) of FIG. 19 shows the state before mounting the cartridge 94 to the drawer member 51. In the present embodiment, to at and at the longitudinal end of a shutter 96, an engaging portion (force receiving portion) 96*a* is provided at the position corresponding to the projection 97 of the cartridge 94 mounted. The engaging portion 96*a* is integral with the shutter 96. Therefore, the shutter 96 and the engaging portion 96*a* are operated interrelatedly with each other. For this reason, the shutter 96 is rotated when the engaging portion 96*a* rotates about the drum 1. If they operate interrelatedly with each other, the engaging portion 96*a* may be unintegral with the shutter 96.

Figure 20:
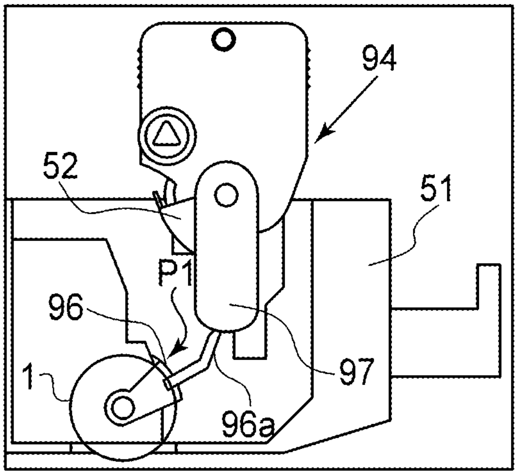
FIG. 20 is a view which shows a mechanism in the case of the mounting of the developing cartridge according to Embodiment 3.
Figure 20:
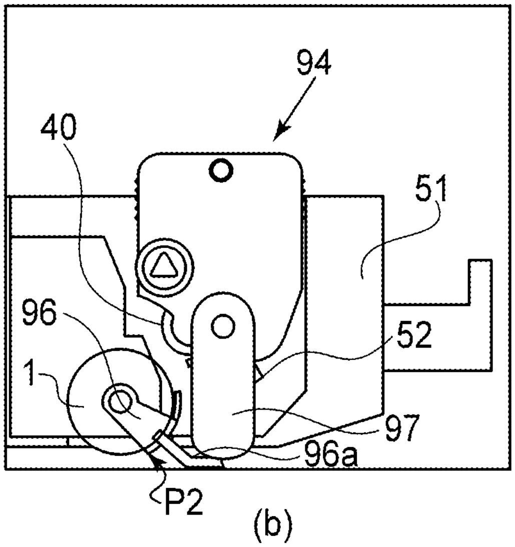
Figure 20:
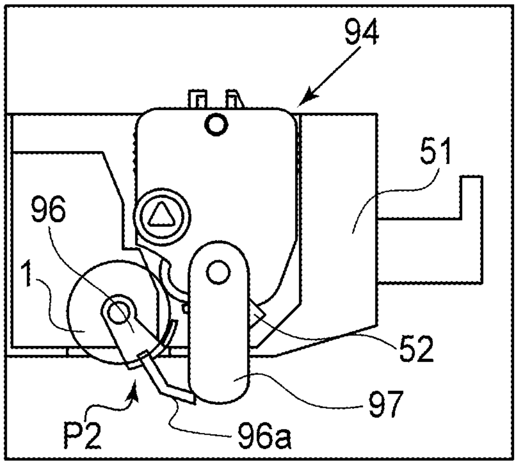

Referring to FIG. 20, the structure that the shutter 96 operates interrelatedly with the mounting operation of the cartridge 94 will be described. In the state of FIG. 19, the drum surface portion above the horizontal plane L through the center (axis) of at least the drum 1 is covered ((b) of FIG. 19). Therefore, at the time, for example, of the mounting and dismounting operation of the cartridge 94, it can be prevented that the foreign matter falls on the upper side which is the drum 1. Accordingly, the damage of the surface of the drum 1 can be prevented. In addition, it can be avoided that the user touches on the surface of the photosensitive drum 1 inadvertently.

When the cartridge 94 further descends from the state of (b) of FIG. 19, the projection 97 begins to contact to the engaging portion 96*a* ((a) of FIG. 20). Furthermore, when the cartridge 94 descends, the shutter 96 begins to rotate toward a retracted position P2 from the protecting position P1 in interrelation with the movement (rotation) of the engaging portion 96*a*. By this, a part of a photosensitive drum 1 is exposed to enable the contact to the surface of the developing roller 40 ((b) of FIG. 20). In other words, according to this embodiment, when the cartridge 94 is not mounted, the shutter 96 does not move inadvertently. Therefore, the surface of the photosensitive drum 1 can be protected. Thereafter, the drawer member 51 is pushed into the main assembly 100*a*. And, the door 10 is shut. In interrelation with the closing operation of the door 10, the urging members 65, 66 press the upper surface of the cartridge 94 downwardly. By this, the cartridge 94 supported by the springs 33, 34 descends. By this, the developing roller 40 moves to the position of contacting to the drum 1 ((c) of FIG. 20). The structure for spacing the developing roller 40 from the drum 1 and the structure for contacting them are the same as those of Embodiment 1.

In the present embodiment, the shutter 52 is provided over the surface of a developing roller 4. For example, the opening and closing of the shutter 52 may be the same as those of Embodiment 2. More particularly, the shutter 52 may move from the protecting position Q1 to the retracted position Q2 in interrelation with the mounting operation of the cartridge 94 to the drawer member 51. As shown in Embodiment 1, the movement of the shutter 52 may be operated interrelatedly with the movement of the drawer member 51 into the inside position I from outside position O. Or, in order only to protect the upper side surface of the photosensitive drum 1, the shutter 52 may be omitted.

According to this embodiment, the effects similar to the embodiments described above are provided. Similarly to Embodiment 1, in addition, according to this embodiment, the contacting and spacing mechanism which contacts and spaces the drum 1 and the developing roller 40 relative to each other is provided. Therefore, at the time, for example, of the mounting and dismounting operation of the cartridge 94, the damage of the surface of the drum 1 and the surface of the developing roller 40 is suppressed. In addition, the gap g can be provided between them so that the shutter 52 and the drum shutter 96 can move from the position of covering those surfaces to the position of exposing them.

While the invention has been described with reference to the structures disclosed herein, it is not confined to the details set forth, and this application is intended to cover such modification or changes as may come within the purposes of the improvements or the scope of the following claims.

This application claims priority from Japanese Patent Applications Nos. 250333/2008 and 181941/2009 filed Sep. 29, 2008 and Aug. 4, 2009, respectively, which are hereby incorporated by reference.

What is claimed is:

1. An image forming apparatus comprising:

a main assembly;

a first unit movable to a first inside position of the main assembly, the first unit including a rotatable image bearing member, a first shutter, and a first support member rotatably supporting the first shutter; and a second unit movable to a second inside position of the main assembly, the second unit including:

a developer accommodating container accommodating developer, a rotatable developing member opposing the image bearing member, the developing member supplying the developer to the surface of the image bearing member, a second shutter, and a second support member rotatably supporting the second shutter, wherein the first unit detachably mountable to the main assembly while supporting the second unit, wherein the second unit includes a development coupling for receiving a driving force for rotating the developing member, wherein the first unit includes a mounting portion for detachably mounting the second unit, and a contacting and spacing member movable between a first position for permitting the developing member to contact the image bearing member and a second position for spacing the developing member from the image bearing member.

* * * * *